(12) United States Patent
Boutayeb et al.

(10) Patent No.: US 10,797,408 B1
(45) Date of Patent: Oct. 6, 2020

(54) ANTENNA STRUCTURE AND METHOD FOR MANUFACTURING THE SAME

(71) Applicant: HUAWEI TECHNOLOGIES CO., LTD., Shenzhen, Guangdong (CN)

(72) Inventors: Halim Boutayeb, Kanata (CA); Fayez Hyjazie, Ottawa (CA); Teyan Chen, Shenzhen (CN); Tao Wu, Shenzhen (CN); Matthew Milyavsky, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/388,274

(22) Filed: Apr. 18, 2019

(51) Int. Cl.
*H01Q 21/24* (2006.01)
*H01Q 1/48* (2006.01)
(Continued)

(52) U.S. Cl.
CPC ............ *H01Q 21/245* (2013.01); *H01Q 1/48* (2013.01); *H01Q 3/24* (2013.01); *H01Q 5/385* (2015.01);
(Continued)

(58) Field of Classification Search
CPC ...... H01Q 3/24; H01Q 9/0421; H01Q 21/245; H01Q 21/28; H01Q 25/00
See application file for complete search history.

(56) References Cited

U.S. PATENT DOCUMENTS 7,310,066 B1   12/2007  Li
9,837,724 B2 *  12/2017  Jan .................... H01Q 1/36
(Continued)

FOREIGN PATENT DOCUMENTS

| CN | 104143700 A | 11/2014 |
| CN | 106450797 A | 2/2017 |
| CN | 106848530 A | 6/2017 |

OTHER PUBLICATIONS

Boutayeb et al., "Beam switching collocated antennas for WLAN systems", IET Digital Library, European conference in Antennas and Propagation EUCAP 2018, Apr. 2018, London, England, retrieved from https://www.researchgate.net/publication/323019086_Beam_Switching_Collocated_Antennas_for_WLAN_Systems on Apr. 15, 2019.

(Continued)

*Primary Examiner* — Ab Salam Alkassim, Jr.
(74) *Attorney, Agent, or Firm* — BCF LLP

(57) ABSTRACT

The disclosed structures and methods are directed to antenna systems configured to transmit and receive a wireless signal in and from different directions. An antenna structure comprises a pair of horizontal-polarization (HP) antenna units forming a first parallel-plate waveguide. One of the HP antenna units and a base unit form a second parallel-plate waveguide. The antenna further comprises a pair of vertical-polarization (VP) antenna units each located in one of the first and second parallel-plate waveguides. Each HP antenna unit comprises inverted F antennas (IFAs) configured to radiate a radio-frequency (RF) waves that are horizontally polarized. Each VP antenna unit comprises VP excitation elements configured to radiate the RF waves that are vertically polarized. A method for manufacturing of the antenna structure is also disclosed.

24 Claims, 17 Drawing Sheets

(51) Int. Cl.
*H04B 7/10* (2017.01)
*H01Q 5/385* (2015.01)
*H01Q 21/28* (2006.01)
*H01Q 25/00* (2006.01)
*H01Q 3/24* (2006.01)
*H01Q 9/04* (2006.01)

(52) U.S. Cl.
CPC ........... *H01Q 9/0421* (2013.01); *H01Q 21/28* (2013.01); *H01Q 25/00* (2013.01); *H04B 7/10* (2013.01)

(56) References Cited

U.S. PATENT DOCUMENTS

| | | | |
|---|---|---|---|
| 10,109,918 B2* | 10/2018 | Thill | H01Q 11/10 |
| 2004/0263392 A1* | 12/2004 | Bisiules | H01Q 9/0457 343/700 MS |
| 2006/0114168 A1* | 6/2006 | Gottl | H01Q 1/246 343/797 |
| 2008/0024382 A1* | 1/2008 | Uddin | H01Q 1/526 343/841 |
| 2015/0263431 A1* | 9/2015 | Moon | H01Q 21/08 343/730 |
| 2016/0372839 A1* | 12/2016 | Watson | H01Q 21/24 |
| 2017/0012364 A1* | 1/2017 | Yang | H01Q 21/24 |
| 2017/0033471 A1* | 2/2017 | Huang | H01Q 9/26 |
| 2017/0085009 A1* | 3/2017 | Watson | H01Q 1/50 |
| 2017/0194718 A1 | 7/2017 | Honda | |
| 2018/0342807 A1* | 11/2018 | Watson | H01Q 21/26 |
| 2019/0131720 A1* | 5/2019 | Yu | H01Q 25/005 |

OTHER PUBLICATIONS

International Search Report and Written Opinion of PCT/CN2020/085684; Xiaodan Pan; dated Jul. 21, 2020.

* cited by examiner

ANTENNA STRUCTURE AND METHOD FOR MANUFACTURING THE SAME

CROSS-REFERENCE TO RELATED APPLICATIONS

This is the first application filed for the instantly disclosed technology.

FIELD OF THE INVENTION

The present invention generally relates to the field of wireless communications and, in particular, to antenna systems configured to transmit and receive a wireless signal in and from different directions.

BACKGROUND

Access Points (APs) for use with Wireless Local Area Networks (WLANs) systems incorporate Multiple Inputs-Multiple Outputs (MIMO) antennae. MIMO antenna are employed to enhance channel capacity and increase the number of wireless streams, in accordance with market service demands.

Each additional wireless stream may be associated with one additional antenna element. Thus, APs will need to incorporate more antenna elements to service the increased number of wireless streams in various frequency ranges while also fitting in the same or even smaller physical space and demonstrating improved performance.

SUMMARY

An object of the present disclosure is to provide an antenna for transmission of a radio-frequency (RF) wave configured to transmit and receive a wireless signal in and from different directions. The antenna as described herein is configured to operate in various frequency ranges.

In accordance with this objective, an aspect of the present disclosure provides an antenna structure for transmission of a radio-frequency (RF) wave, the antenna structure comprising: a base unit; a first horizontal-polarization (HP) antenna unit having a plurality of first inverted F antennas (IFAs) configured to radiate the RF wave in a horizontal polarization; a second HP antenna unit having a plurality of second IFAs configured to radiate the RF wave in the horizontal polarization, positioned so that the first HP antenna unit and the second HP antenna unit are spaced apart from each other and form a first parallel-plate waveguide, and so that the second HP antenna unit and the base unit are spaced apart from each other and form a second parallel-plate waveguide. The antenna also comprises a first vertical-polarization (VP) antenna unit located in the first parallel-plate waveguide and having a plurality of first VP excitation elements configured to radiate the RF wave in a vertical polarization; and a second VP antenna unit located in the second parallel-plate waveguide and having a plurality of second VP excitation elements configured to radiate the RF wave in the vertical polarization.

In at least one embodiment, the antenna further comprises first HP switchable elements, each connected to one of the first IFAs, the first HP switchable elements being configured to control a radiation pattern of the first HP antenna unit. In at least one embodiment, the antenna further comprises second HP switchable elements, each connected to one of the second IFAs, the second HP switchable elements being configured to control the radiation pattern of the second HP antenna unit.

In at least one embodiment, the first VP antenna unit and the second VP antenna unit further comprise parasitic elements for controlling a radiation pattern of RF wave by the first VP antenna unit and the second VP antenna unit. The parasitic elements may be operated by VP switchable elements located in at least one of the first HP antenna unit and the second HP antenna unit.

In at least one embodiment, the first VP excitation elements form a first VP exciting probe, and the second VP excitation elements form a second VP exciting electric probe.

In at least one embodiment, the antenna further comprises a pair of second feeding supports and a pair of first feeding supports configured to provide electrical current to second HP switchable elements, first HP switchable elements and first VP switchable elements. The pair of second feeding supports may be configured to provide direct current to second VP switchable elements.

In at least one embodiment, the first HP antenna unit may comprise a first HP substrate having apertures for receiving protruding portions of first VP substrates of the first VP antenna unit. The received protruding portions of the first VP substrates may be configured to electrically connect first parasitic elements located on the first VP substrates and first VP switchable elements, the first VP switchable elements being located on the first HP substrate and configured to operate the first parasitic elements for controlling a radiation pattern of the second VP antenna unit.

In at least one embodiment, the first HP substrate may comprise aperture for receiving protruding portions of first feeding supports configured to electrically connect the first VP switchable elements to first DC lines located on surfaces of the first feeding supports. The second HP antenna unit may comprise a second HP substrate having apertures for receiving other protruding portions of the first VP substrates of the first VP antenna unit.

In at least one embodiment, the base unit may comprise second VP switchable elements configured to operate second parasitic elements for controlling a radiation pattern of the second VP antenna unit, the second parasitic elements being electrically connected to the second VP switchable elements.

In at least one embodiment, the second HP antenna unit further comprises apertures configured to receive protruding portions of second feeding supports comprising portions of second DC lines and second feeding ground layers; DC conducting pads located on the second HP antenna unit and configured to electrically connect first DC lines located on first feeding supports to the second DC lines located on the second feeding supports; and ground conducting pads located on the second HP antenna unit and configured to electrically connect first feeding ground layers located on first feeding supports to the second feeding ground layers located on the second feeding supports.

In at least one embodiment, each of the first HP antenna unit, the second HP antenna unit, the first VP antenna unit, the second VP antenna unit, and base unit may comprise at least one substrate made of a printed circuit board (PCB).

In at least one embodiment, the first HP antenna unit and the second VP antenna unit are configured to operate in a first frequency range; and the second HP antenna unit and the first VP antenna unit are configured to operate in a second frequency range. The first frequency range may overlap with the second frequency range. In at least one embodiment, a difference between the first frequency range and the second frequency range is more than 1 gigahertz (GHz). The first frequency range may comprise frequencies that are lower than frequencies of the second frequency range. The first frequency range may comprise 5 GHz and the second frequency range comprises 6 GHz.

In at least one embodiment, the antenna structure is one of a plurality of antenna structures forming an antenna array, and the antenna array further comprises a plurality of third antenna units, each third antenna unit having a monopole configured to radiate RF wave being vertically polarized in a third frequency range and a third IFA configured to radiate the RF wave being horizontally polarized. In at least one embodiment, the third frequency range comprises 2.5 GHz.

In accordance with other aspects of the present disclosure, there is provided a method for manufacturing of an antenna structure for transmission of a radio-frequency (RF) wave. The method comprises attaching inverted F antennas (IFAs) and switchable elements to a first horizontal-polarization (HP) substrate of a first HP antenna unit and a second HP substrate of a second HP antenna unit; attaching first and second vertical-polarization (VP) excitation elements and first and second parasitic elements to first VP substrates and second VP substrates; attaching a first HP RF cable to the first HP antenna unit, attaching a first VP RF cable to one of first VP substrates, and attaching a second HP RF cable to a second HP antenna unit.

In at least one embodiment, the method comprises also coupling the first VP substrates to the first HP antenna unit and electrically connecting the first parasitic elements located on the first VP substrates to corresponding first RF connecting pads located on the first HP substrate; attaching second feeding supports and second VP substrates to a base unit; coupling the second HP antenna unit to first feeding supports and the second feeding supports and electrically connecting first and second DC lines and first and second feeding ground layers located on the first feeding supports and on the second feeding supports to corresponding second DC conducting pads and second ground pads located on the second HP substrate; and coupling the first HP unit to the first feeding supports and electrically connecting the first DC lines and the first feeding ground layers located on the first feeding supports to corresponding first DC conducting pads and first ground pads located on the first HP substrate.

In at least one embodiment, attaching the first VP RF cable to the first VP antenna unit further comprises attaching the first VP RF cable to a VP feeding substrate and placing the VP feeding substrate approximately in parallel to the first HP substrate and the second HP substrate.

Implementations of the present disclosure each have at least one of the above-mentioned object and/or aspects, but do not necessarily have all of them. It should be understood that some aspects of the present disclosure that have resulted from attempting to attain the above-mentioned object may not satisfy this object and/or may satisfy other objects not specifically recited herein.

Additional and/or alternative features, aspects and advantages of implementations of the present disclosure will become apparent from the following description, the accompanying drawings and the appended claims.

BRIEF DESCRIPTION OF THE FIGURES

Further features and advantages of the present disclosure will become apparent from the following detailed description, taken in combination with the appended drawings, in which.

Figure 1:
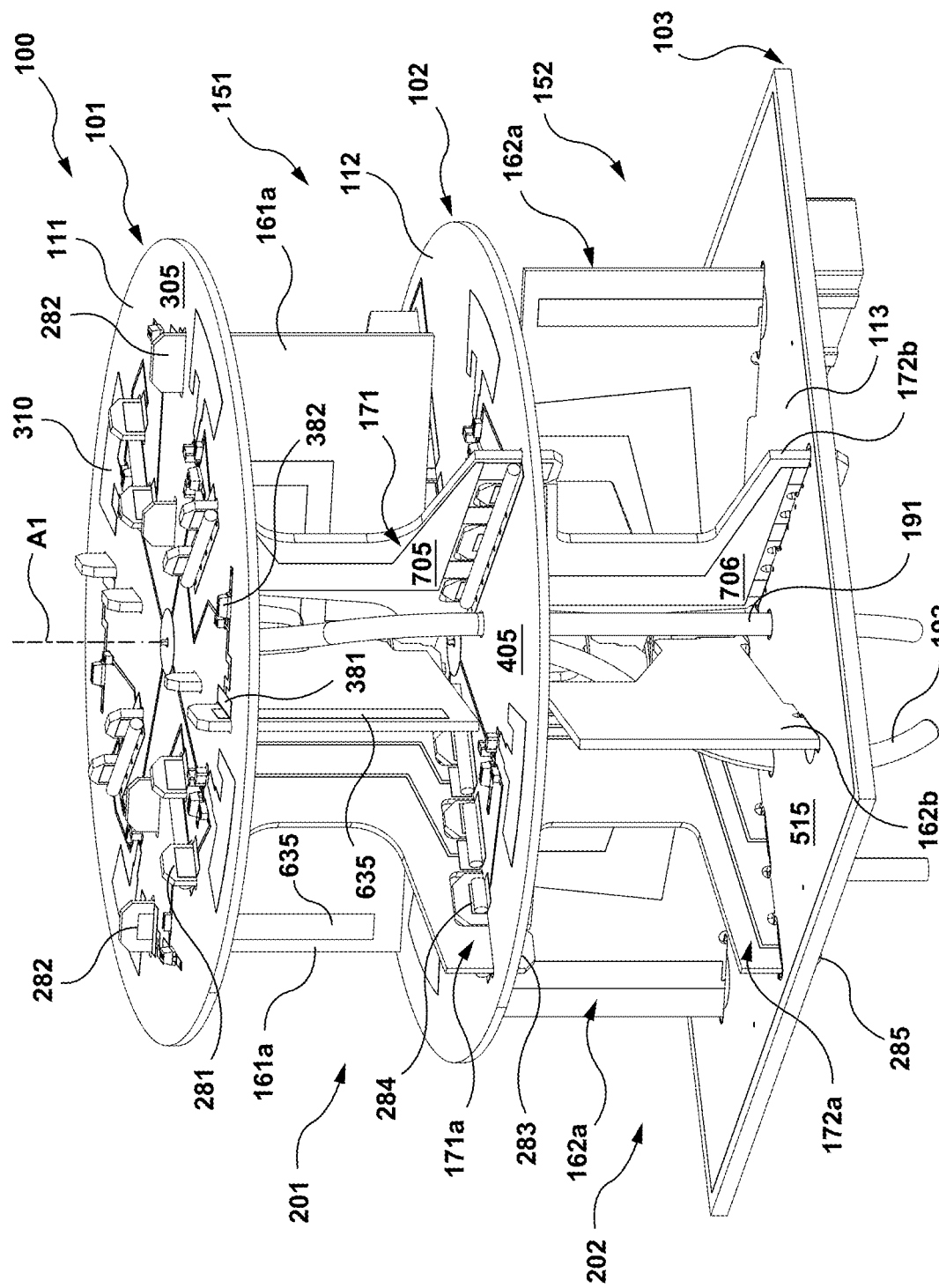
FIG. 1 depicts a perspective view of an antenna structure, in accordance with various embodiments of the present disclosure.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current antenna implementations. In particular, the instant disclosure describes an antenna structure configured to receive and radiate electromagnetic (EM) waves in at least two frequency bands and in two different polarizations. The EM waves that are propagated by and received by the disclosed antenna structure may operate within a radio frequency (RF) range (i.e., RF wave). In some other embodiments, the EM waves may operate within a microwave range (e.g., about 1 GHz to about 30 GHz).

The antenna structure and associated technology described herein may be embodied in a variety of different electronic devices (EDs) including, for example, base stations (BSs), user equipment (UE), wireless routers, wireless access points, etc.

As used herein, the term "about" or "approximately" refers to a +/−10% variation from the nominal value. It is to be understood that such a variation is always included in a given value provided herein, whether or not it is specifically referred to.

As referred to herein, the term "guided wavelength" refers to a guided wavelength of the propagating EM wave that provides a near transverse electromagnetic mode (TEM) in a microstrip line (i.e., quasi TEM). In addition, as referred to herein, the term "via" refers to an electrical connection providing electrical connectivity between the physical layers of an electronic circuit. As referred to herein, the term "RF cable" refers to an RF source coaxial cable.

Unless defined otherwise, all technical and scientific terms used herein have the same meaning as commonly understood by one of ordinary skill in the art to which this invention belongs.

The antenna structure as described herein, in various embodiments, may be formed from several multi-substrate printed circuit boards (PCBs). The antenna structure may also comprise PCB features such as etched conductive substrates, vias, and other elements. Such a PCB implementation may be suitably compact for inclusion in various wireless communication equipment, including basestations, access points and mobile devices, well as being cost-effective for volume production.

Figure 2:
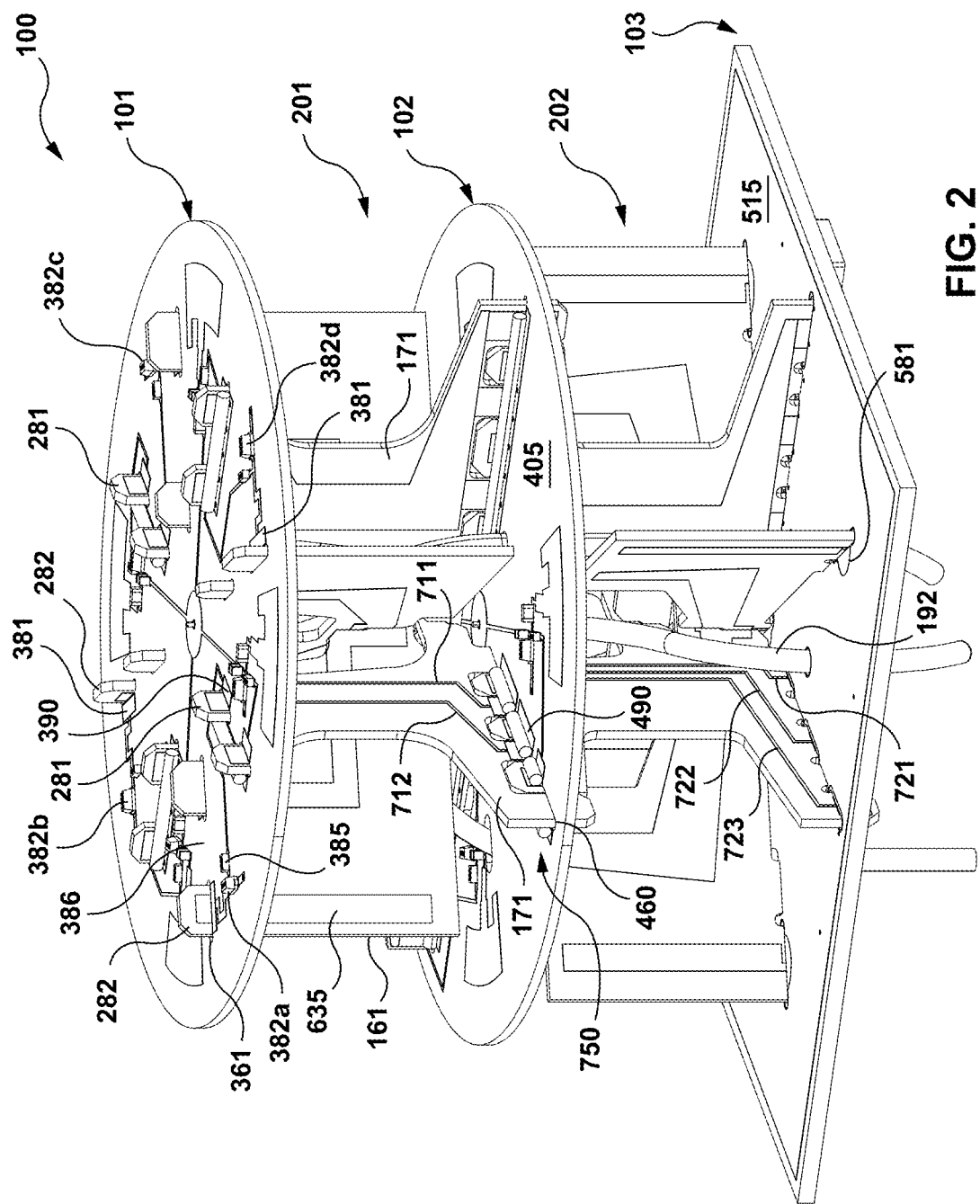
FIG. 2 depicts an alternative perspective view of the antenna structure of FIG. 1.

Referring to the drawings, FIGS. 1, 2 depict perspective views of antenna structure 100, in accordance with at least one non-limiting embodiment. As shown, antenna structure 100 comprises a first horizontal-polarization (HP) antenna unit 101 (also referred to herein as an "upper HP unit" or "first HP unit"), a second HP antenna unit 102 (also referred to herein as an "lower HP unit" or "second HP unit"), a first vertical-polarization (VP) antenna unit 151 (also referred to herein as an "upper VP unit" or "first VP unit"), and a second VP unit 152 (also referred to herein as a "lower VP unit" or "second VP unit"). Antenna structure 100 also comprises a base unit 103 and a pair of first feeding supports 171 as well as a pair of second feeding supports 172.

Each of the first and second HP units 101, 102 is configured to radiate and receive horizontally polarized RF waves. Each of the first and second VP units 151, 152 is configured to radiate and receive vertically polarized RF waves. The first and second HP units 101, 102 and first and second VP units 151, 152 are collocated, as described herein, in order to reduce the size of antenna structure 100.

Antenna structure 100 may operate in both, horizontal and vertical polarizations, to accommodate a plurality of wireless data streams (e.g., four data streams). Moreover, the radiation pattern of each wireless data stream may be controlled and modified such that antenna structure 100 operates in an omnidirectional mode as well as various directional modes. The antenna structure 100 may also operate in two different frequency ranges.

Figure 3A:
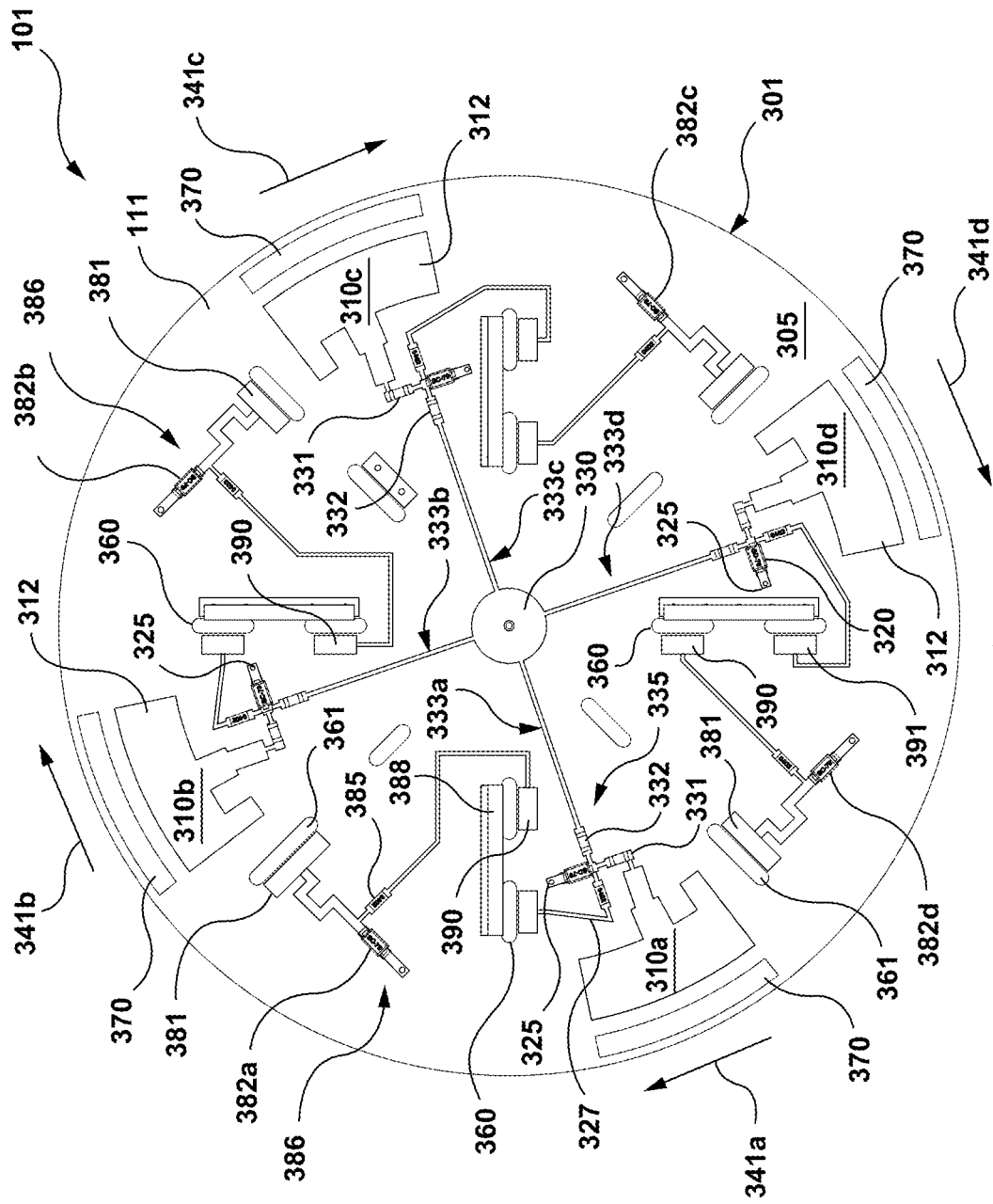
FIG. 3A depicts a top view of a first horizontal-polarization (HP) unit of the antenna structure, in accordance with various embodiments of the present disclosure.
Figure 3B:
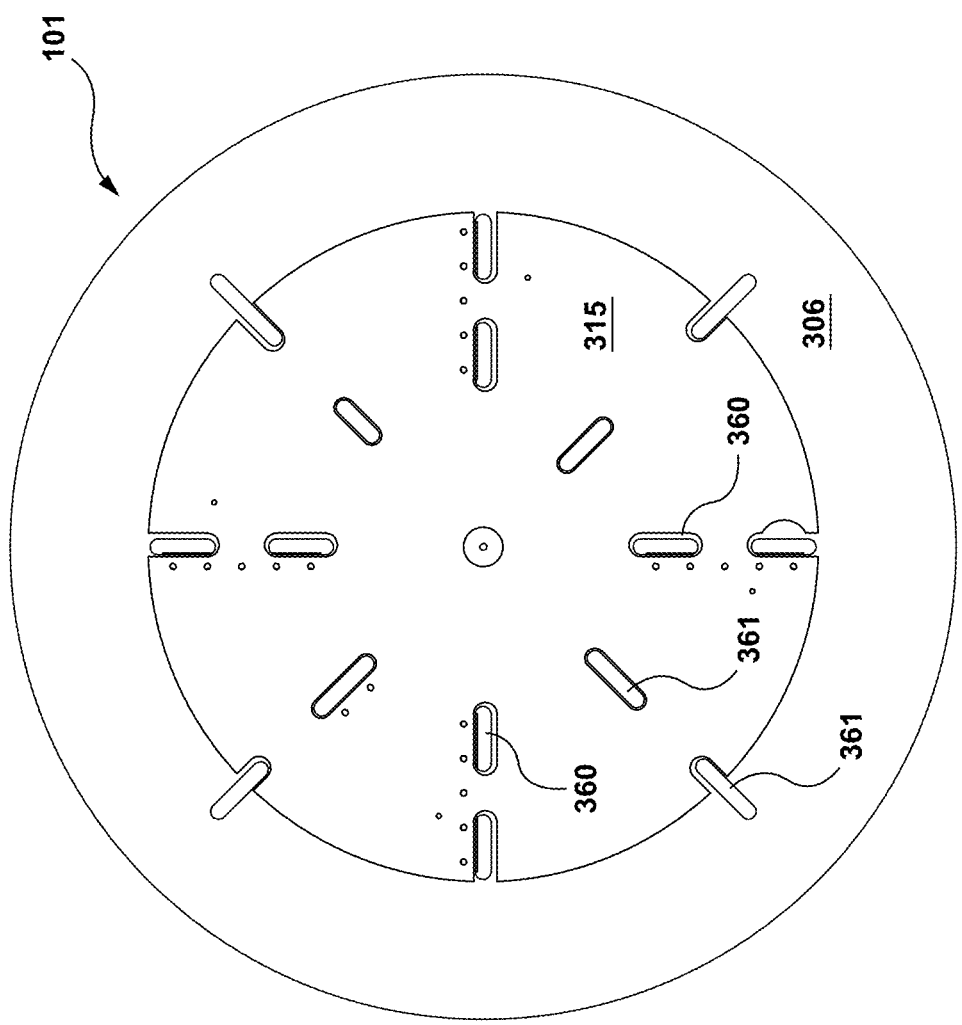
FIG. 3B depicts an underside view of first HP unit, in accordance with various embodiments of the present disclosure.
Figure 4A:
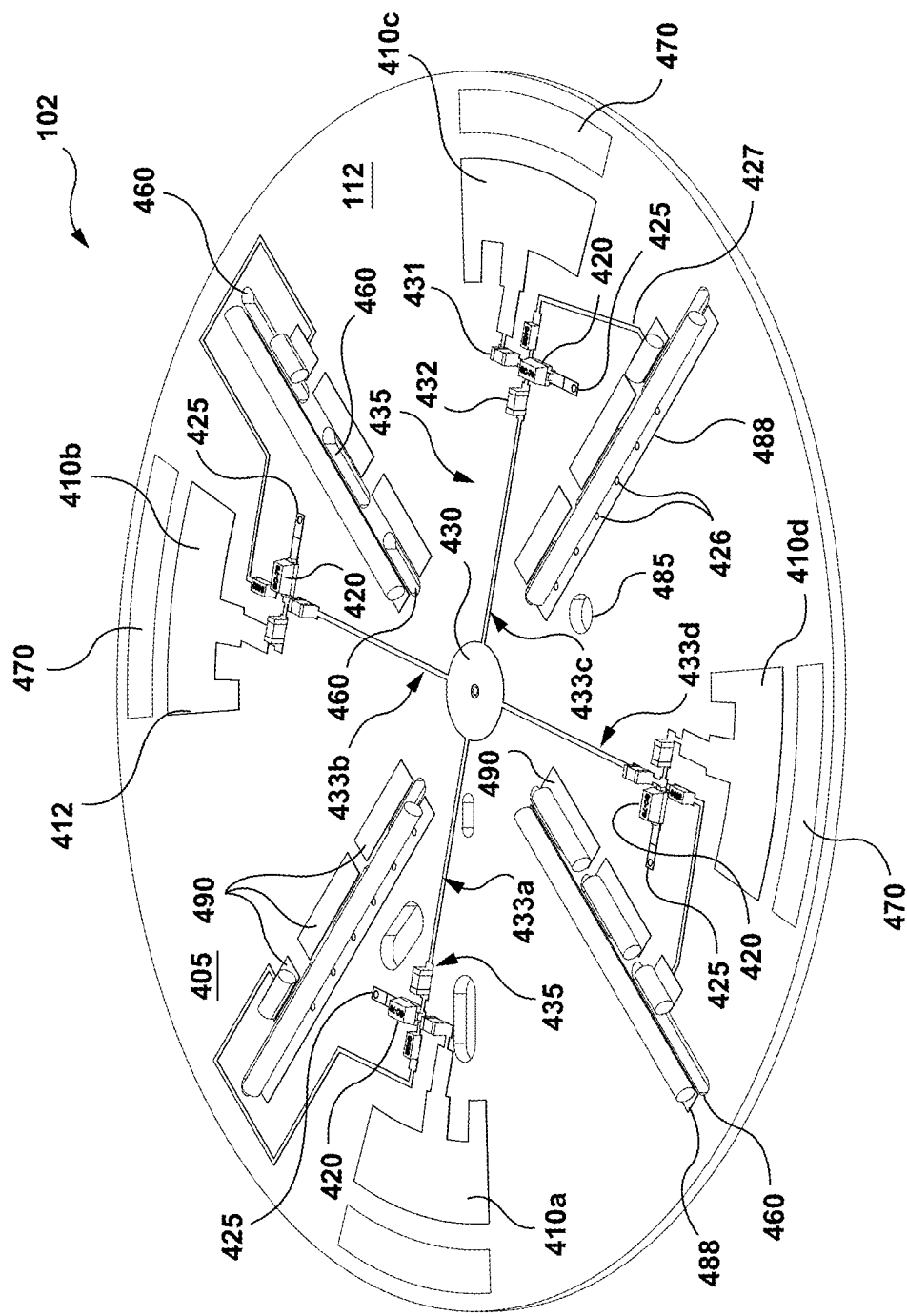
FIG. 4A depicts a perspective top view of a second HP unit, in accordance with various embodiments of the present disclosure.
Figure 4B:
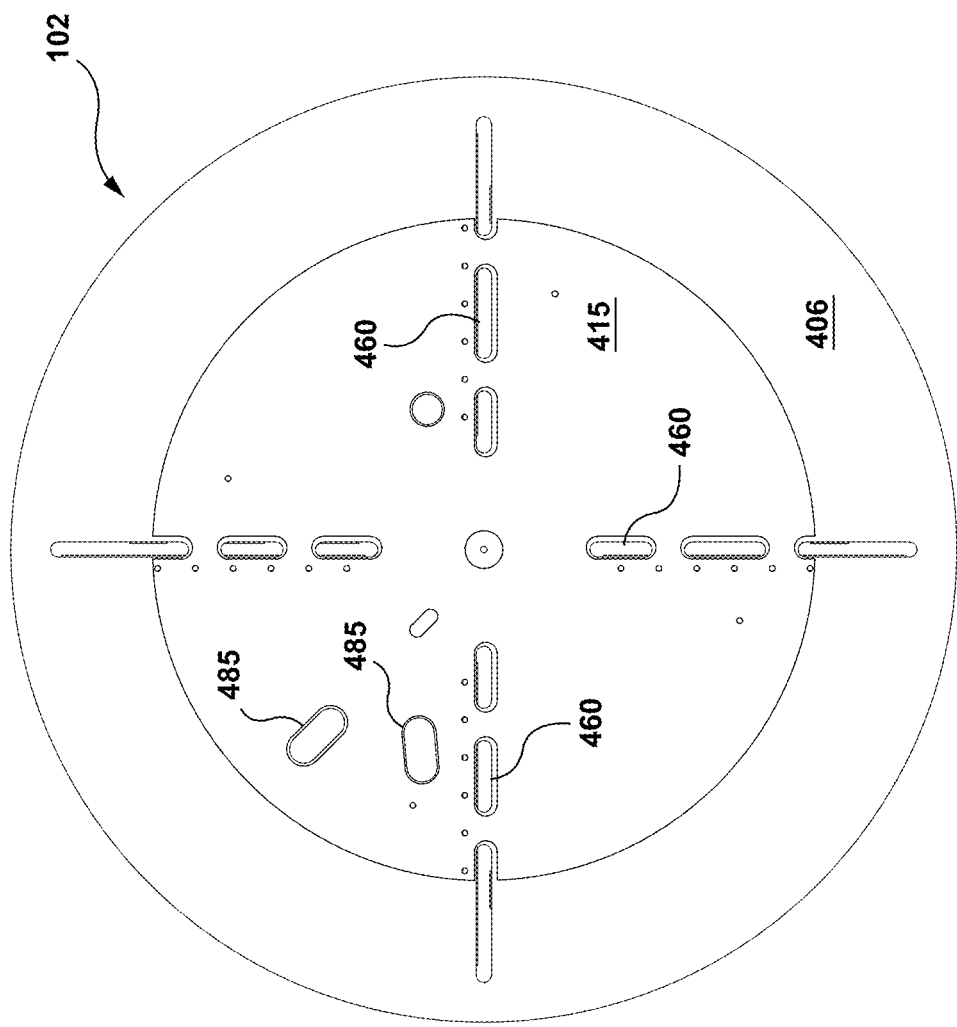
FIG. 4B depicts an underside view of the second HP unit, in accordance with various embodiments of the present disclosure.

FIG. 3A depicts top view of first HP unit 101 of antenna structure 100 and FIG. 3B depicts an underside view of first HP unit 101 of antenna structure 100, in accordance with various embodiments. In addition, FIGS. 4A, 4B depict a perspective top view and an underside view, respectively, of second HP unit 102 of antenna structure 100, in accordance with the various embodiments. It should be noted that references to "top", "underside", or "bottom" are provided herein for ease of reference to the drawings and are not intended to be limiting.

As depicted in FIG. 3A, the first HP unit 101 comprises a first HP substrate 111 having first HP excitation elements 310 on its top surface 305 and a first ground layer 315 on its underside surface 306. And, as depicted in FIG. 4A, the second HP unit 102 comprises a second HP substrate 112 having second HP excitation elements 410 on its top surface 405 and a second ground layer 415 on its underside surface 406.

Returning to FIG. 1, base unit 103 comprises a base substrate 113 and a main ground layer 515 located on a top surface of base unit 103. Base substrate 113 may be fabricated so that it has a set of apertures defined within it, as will be discussed in more detail below. In operation, ground layers 315, 415 and 515 of first HP unit 101, second HP unit 102 and base unit 103 are electrically connected to an electrical ground. These ground layers 315, 415 and 515 may be made from a metal material, such as copper.

The first HP substrate 111 is positioned substantially parallel to both second HP substrate 112 and base substrate 113. In other words, first HP substrate 111, second HP substrate 112, and base substrate 113 are arranged to be "stacked up" in a parallel manner.

A first radial parallel-plate waveguide 201 is created in the space between substantially parallel ground layers 315 and 415. A second radial parallel-plate waveguide 202 is created in the space between substantially parallel ground plates 415 and 515. The first and second parallel-plate waveguides may also be referred to as the first and second waveguides respectively. Moreover, as shown in FIG. 1, the first VP unit 151 is located within first waveguide 201 and second VP unit 152 is located within second waveguide 202.

Referring to FIG. 3A, first HP unit 101 comprises a plurality of first HP excitation elements 310 (illustrated as 310a, 310b, 310c and 310d) located in figure HP substrate 111. In the illustrated embodiment, first HP excitation elements 310 are implemented as inverted-F antennas (IFAs) 310a, 310b, 310c, 310d (collectively referred to as "first IFAs 310"). Similarly, as depicted in FIG. 4A, second HP excitation elements 410 are implemented as IFAs 410a, 410b, 410c, 410d (collectively referred to as "second IFAs 410"). The second IFAs 410 are located on second HP substrate 112 of second HP unit 102. In the illustrated embodiment, first HP unit 101 and second HP units each contain four IFAs 310, 410.

The first IFAs 310 and second IFAs 410 are configured to radiate and to receive EM waves. In at least one embodiment, IFAs 310, 410 are printed on first HP substrate 111 and second HP substrate 112, respectively. Each of the IFAs 310, 410 is operated and controlled by a corresponding HP switchable element 320, 420. The HP switchable elements 320, 420 may encompass PIN diodes, variable capacitors (varicaps), microelectromechanical systems (MEMS) elements, etc.

As respectively depicted in FIGS. 3B, 4B, each HP switchable element 320, 420 is coupled to a ground via 325, 425. Ground vias 325, 425 are coupled to a first ground layer 315, 415 located on the underside of first HP substrate 111, and on the underside of second HP substrate 112. In addition, each of the HP switchable elements 320, 420 is coupled to a controller (not shown) via a DC circuit 327, 427 and DC line. The controller controls the operation of each HP switchable element 320, 420, such that HP switchable elements 320, 420 may be in an "ON" operational mode or an "OFF" operational mode.

When one of HP switchable elements 320, 420 is in the "ON" operational mode, it acts like a resistor equivalent to the serial resistance of HP switchable elements 320, 420 (e.g., to the serial resistance of the constituent PIN diode). The shortening vias 325, 425 introduce an open circuit to the corresponding first feeding port 330 or second feeding port 430. In turn, the associated IFA 310, 410 becomes disconnected from its corresponding feeding port 330, 450. In an exemplary embodiment, the distance between feeding port 330, 430 and the shortening (ground) vias 325, 425 may be a quarter of a guided wavelength (e.g., approximately 9.6 mm at 6.5 GHz, for a microstrip line with a 1 mm thickness of FR4 substrate).

The process of switching HP switchable elements 320, 420 between the "ON" and "OFF" operational modes allows for the modification and control of a horizontally-polarized radiation pattern of antenna structure 100. In some embodiments, by controlling HP switchable elements 320, 420 it is possible to modify the direction of operation of antenna structure 100, including direction of radiation and reception of the RF waves.

As depicted, each of IFAs 310, 410 is electrically coupled to a respective matching circuit 335, 435. Each matching circuit 335, 435 is configured with a first capacitor 331, 431, a second capacitor 332, 432, and a quarter wavelength transformer disposed between the IFA and central feeding ports 330, 430. Matching circuits 335, 435 are connected to feeding port 330, 430, respectively.

When one of the HP switchable elements 320, 420 is in the "OFF" operational mode, the respective IFA 310, 410 is electrically connected to first RF ports 330, 430 via matching circuits 335, 435. The matching circuits 335, 435 enable the matching of a 50Ω impedance of IFA 310, 410 with a 50Ω impedance of respective feeding ports 330, 430.

As shown in FIGS. 3A, 4A, feeding ports 330, 430 are electrically coupled to shortening vias 325, 425 by virtue of branches 333a, 333b, 333c, 333d, and 433a, 433b, 433c, 433d, respectively. The branches 333a-333d and 433a-433d are configured to match the 50Ω impedance of associated feeding ports 330, 430. The distance between feeding ports 330, 430 and shortening vias 325, 425 along branches 333a-333d and 433a-433d is approximately a quarter of the guided wavelength to maintain an open circuit for one of the branches 333a-333d or 433a, 433d, as seen by the feeding point, when one diode is in "ON" operational mode.

It should be appreciated that, while the described embodiments present four IFAs, this is done for illustrative purposes. For example, the first HP unit 101 and second HP unit 102 may comprise less than or more than four IFAs 310, 410, and a corresponding number of matching circuits may be provided to match 50Ω impedance of IFA 310, 410 with 50Ω impedance of respective feeding port 330, 430.

FIGS. 3A, 4A, illustrate that IFAs 310, 410 positioned such that respective radiating arm portions 312, 412 of IFAs 310, 410 point in one direction relative to circumferences 301, 401. The depicted electric field polarization arrows 341a, 341b, 341c, 341d in FIG. 3A indicate that IFAs 310 may be configured to radiate an electric field with vectors that form a circle. This configuration of IFAs 310, 410 serves to cancel out radiation in a direction normal to ground layer 315 and increases radiation at angles close to ground layer 315. In this manner, the configuration of IFAs 310, 410 operates to increase the range of radiated RF waves.

In addition, the first HP unit 101 and the second HP unit 102 may also comprise directors 370, 470 located along the longer sides of IFAs 310, 410 as depicted in FIG. 3A, 4A. The directors 370, 470 may be configured to adjust directional angles to further increase the radiation range of RF waves.

In operation, when all first HP switchable elements 320 are in the "OFF" operational mode, first HP unit 101 may be configured to operate in an omnidirectional mode, such that first HP unit 101 is capable of radiating RF waves to, and receive RF waves, from any directional angle. Similarly, second HP unit 102 may also be configured to operate in the omnidirectional mode when all first HP switchable elements 420 are in the "OFF" operational mode. It will be appreciated that in the omnidirectional mode, the directional gain of first HP unit 101 and second HP unit 102 may, at most, weakly relate to the angle of radiation with respect to the central axis µl of antenna structure 100.

Figure 5:
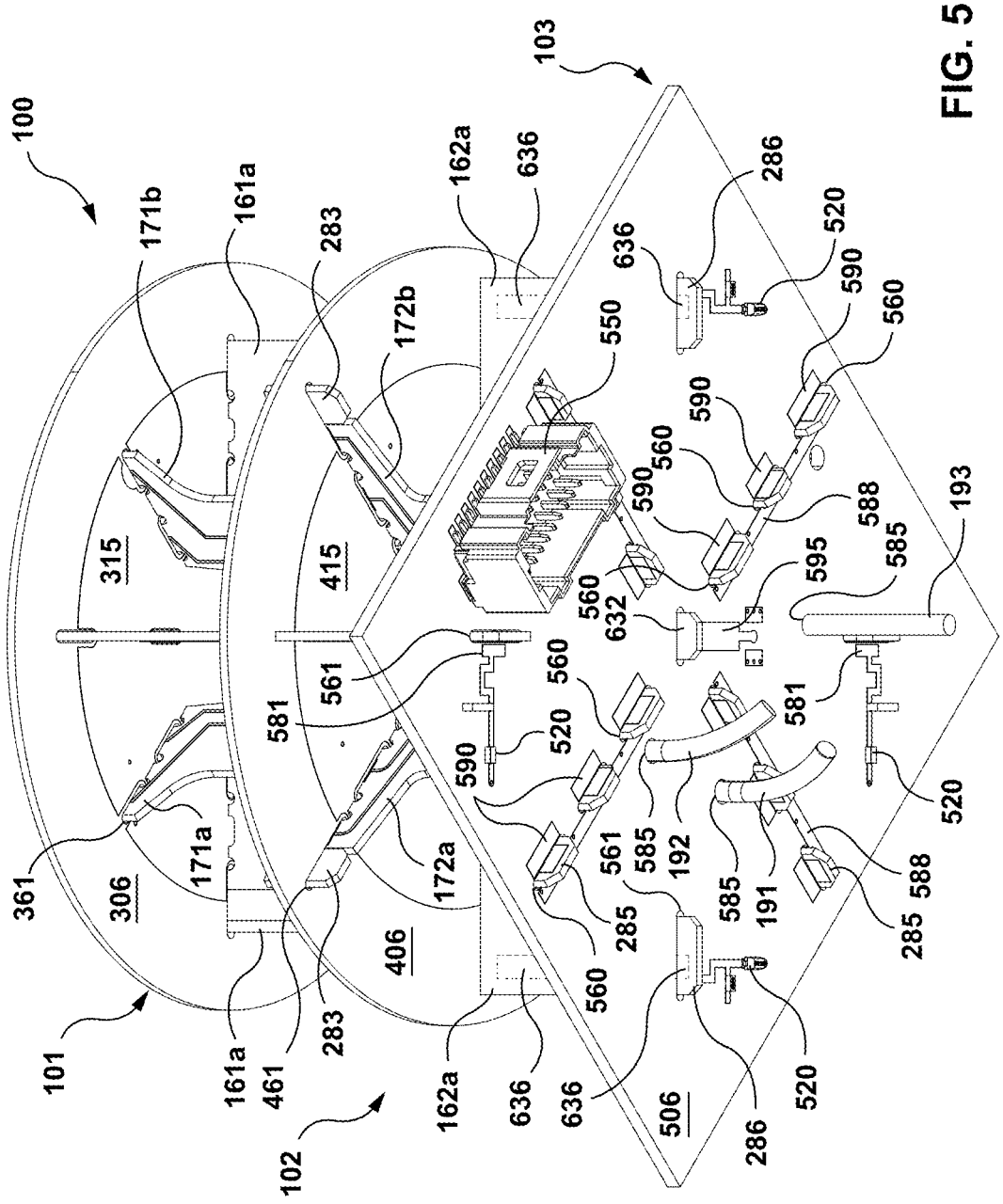
FIG. 5 depicts a perspective underside view of the antenna structure of FIG. 1, in accordance with various embodiments of the present disclosure.

FIG. 5 depicts an underside view of antenna structure 100, in accordance with at least one non-limiting embodiment. As noted above, the ground layers are electrically coupled to ground vias 325, 425. As will be discussed in greater detail below, ground-bound electrical lines (not depicted in FIG. 5) of feeding supports 171a, 171b, 172a, 172b couple ground layers 315, 415 to the electrical ground.

As discussed above, antenna structure 100 includes a first VP unit 151 and a second VP unit 152 that are each configured to radiate and receive vertically polarized RF waves. The first VP unit 151 comprises two first VP substrates 161a, 161b, and second VP unit 152 comprises two second VP substrates 162a and 162b.

Figure 6A:
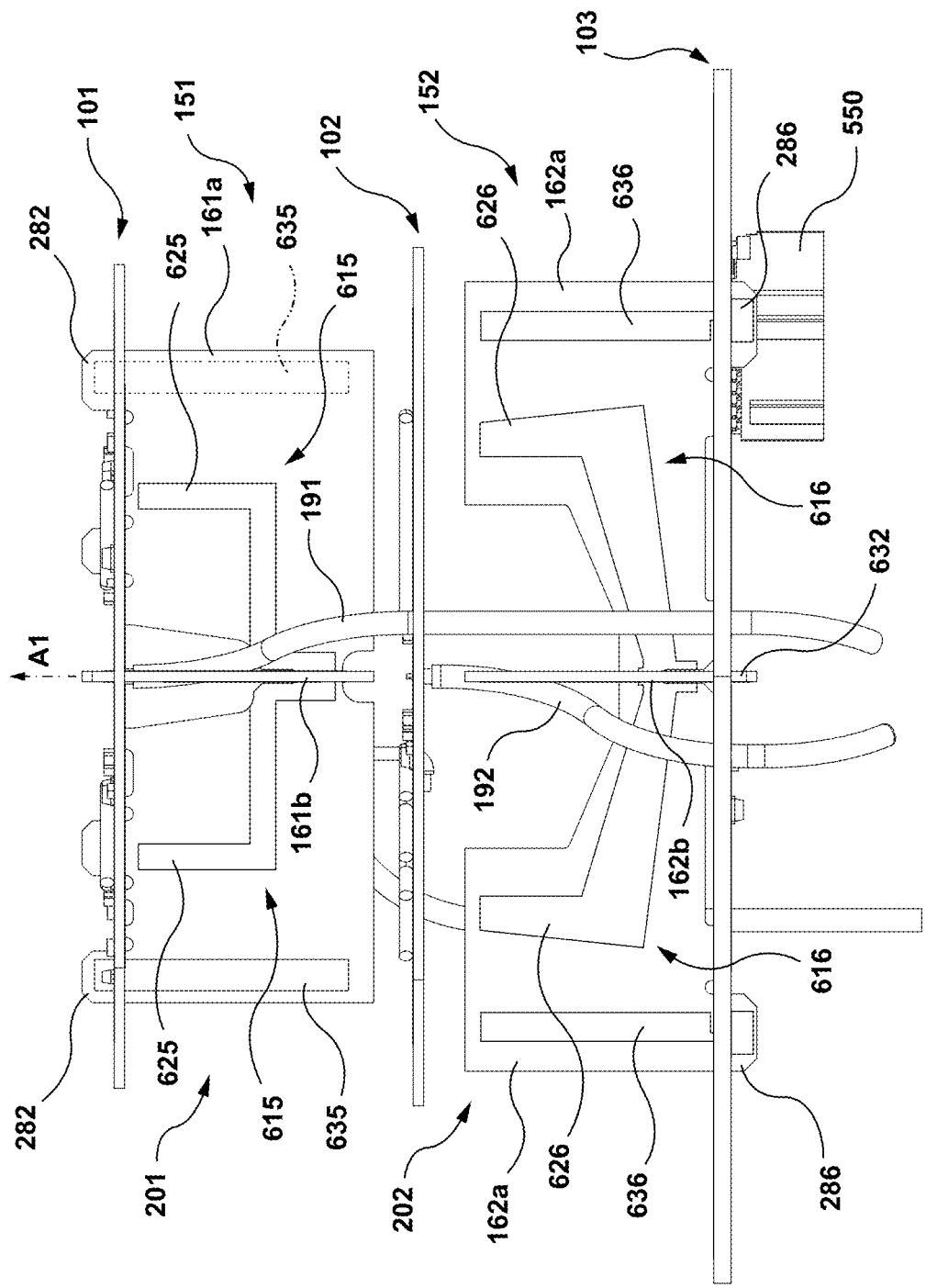
FIG. 6A depicts a front view of a first vertical-polarization (VP) unit and a second VP unit, mounted on first and second HP units of the antenna structure of FIG. 1, in accordance with various embodiments of the present disclosure.
Figure 6B:
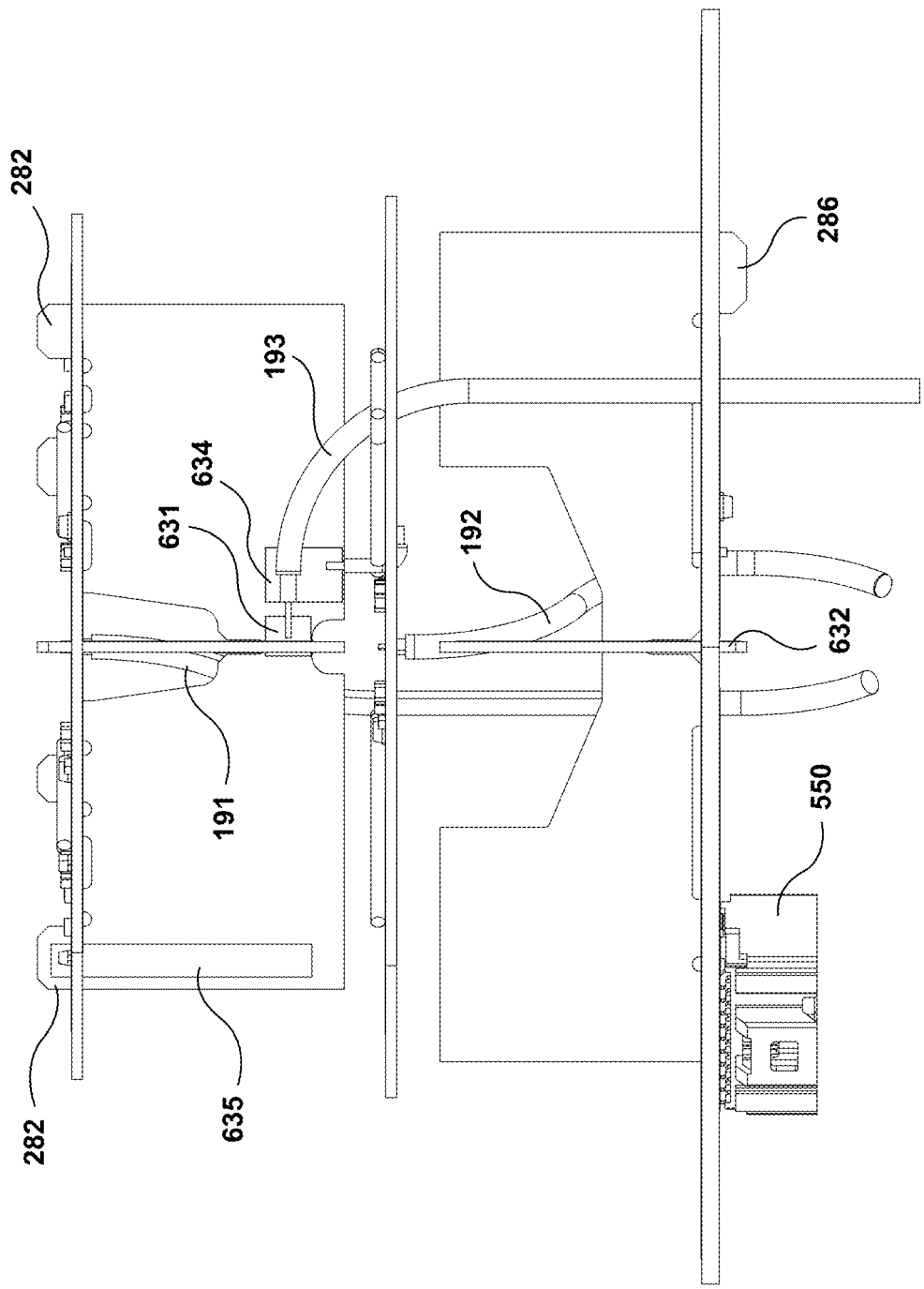
FIG. 6B depicts a back view of the first VP unit and the second VP unit, mounted on first and second HP units of the antenna structure of FIG. 1, in accordance with various embodiments of the present disclosure.

FIG. 6A depicts a front view of the first and second VP units 151, 152, which are mounted on first and second HP units 101, 102. FIG. 6B depicts a back view of first and second VP units 151.

In the illustrated embodiment, first VP unit 151 includes an electric probe with four branches for exciting the vertical polarization. Each of the four branches is referred to herein as a first VP excitation element 615. The second VP unit 152 also includes exciting electric probe with four branches, each branch referred to herein as a second VP excitation element 616. Each VP excitation element 615, 616 may be made of a conductive pattern or region located on one of substrates 161*a*, 161*b*, 162*a*, 162*b*. The first and second VP excitation elements 615, 616 are configured to radiate the EM field (RF signal) into the first and the second waveguides 201, 202, respectively.

To excite the radiation in waveguides 201, 202, excitation portions (i.e., probes) 625, 626 of the excitation elements 615, 616 are positioned to be substantially perpendicular to the ground layers forming waveguides 201, 202. As waveguides 201, 202 are parallel to each other, excitation portions 625, 626 of excitation elements 615, 616 are positioned substantially perpendicular to second HP substrate 112.

Excitation elements 615, 616 may have various forms or patterns. The form of excitation elements 615, 616 may be selected to match their impedance to the impedance of waveguides 201, 202, respectively.

The RF signal is received via a first and a second VP RF port 631, 632. These first and second VP RF ports 631, 632 are, in the illustrated embodiment, located in central portions of the first and second VP units 151, 152.

As depicted in FIG. 6B, for some embodiments, a VP RF cable 193 is attached to first VP unit 151. The VP RF cable 193 operates to supply the RF signal to first VP unit 151. A second VP RF port 632 of second VP unit 152 is connected to RF supply via base unit 103.

In the illustrated embodiment, first VP substrates 161*a* and 161*b* are positioned substantially perpendicular to each other such that the four probes 615 are symmetrically distributed about central axis μl of antenna structure 100. Similarly, the second VP substrates 161*a* and 161*b* are positioned substantially perpendicular to each other such that four probes 616 are symmetrically distributed about the central axis μl of antenna structure 100.

In the illustrated embodiment, first VP substrates 161*a*, 161*b* are positioned such that they cross each other at about central axis μl of antenna structure 100. Second VP substrates 162*a*, 162*b* are also positioned such that they cross each other at about central axis μl of antenna structure 100. In some embodiments, there may be one or more first VP substrates 161, each having a suitable number of VP excitation elements 625. It should be noted that antenna structure 100 may have any number of first and second VP substrates 161, 162, as long as they are symmetrically and evenly distributed about antenna central axis μl in first and second waveguides 201, 202, respectively.

In the illustrated embodiment, each of the first VP excitation elements 615 is located at a substantially equal distance from central axis μl of antenna structure 100. Similarly, each of the second VP excitation elements 616 is located substantially equal distance from central axis μl of antenna structure 100 with respect to the other second VP excitation elements 616. Positioning VP excitation elements 615, 616 symmetrically relative to each other permits achieving omnidirectional radiation of first VP unit 151 and second VP unit 152, respectively. The distances between VP excitation elements 615, 616 and the central axis μl may be determined by the width of the corresponding first and second waveguides 201, 202. It should be noted that in some embodiments, each of the first and second VP excitation elements 615, 616 may be substantially equidistant from μl, while in other embodiments, each of the first VP excitation elements 615 are substantially equidistant from μl but are a different distance from μl than the second VP excitation elements 616.

It will be appreciated that the substrates of first and second HP units 101, 102 and first and second VP units 151, 152 may be manufactured using various technologies, including, but not limited to, PCB technologies.

Referring again to the embodiment of FIG. 6A, first VP unit 151 further comprises one or more first parasitic elements 635 located on first VP substrates 161. The first parasitic elements 635 are positioned substantially in parallel to excitation portions 625 of the excitation elements 615. The second parasitic elements 636 are located on second VP substrates 162 substantially in parallel to the excitation portions 626 of the excitation elements 616. Each first and second parasitic element 635, 636 is located further away from central axis μl compared to corresponding excitation portions 625, 626 of the corresponding excitation elements 615, 616.

A first parasitic element 635 may be electrically connected to one or both of first HP unit 101 and second HP unit 102. As shown, first parasitic elements 635 are mechanically and electrically connected to first HP unit 101. The electrical connection may be achieved, in some embodiments, by soldering parasitic elements 635 to RF connecting pads 381 after inserting protruding portions of first VP substrate 161 in apertures 361 in first HP unit 101.

Referring now to the embodiments of FIGS. 2 and 3A, first parasitic elements 635 are electrically connected to first VP switchable elements 382*a*, 382*b*, 382*c*, 382*d* (also referred to herein as first switchable elements 382) located on first HP unit 101. In the illustrated embodiment, first VP switchable elements 382 are each connected to a parasitic feeding circuit 386 having resistors 385. Each parasitic feeding circuit 386 is connected to a VP DC line connector 390 that is electrically connected to a VP DC line 711 located on a surface of first feeding support 171. It should be clear to those skilled in the art that these features of the different illustrations can be implemented independently of the other features of those figures.

In the embodiment depicted in FIG. 2, first VP substrate 161 includes protruding portions 282. The protruding portions 282 of first VP substrates 161 and first VP apertures 361 of first HP unit 101 are dimensioned such that VP apertures 361 can receive protruding portions 282 to mount the first HP substrate 111 onto first VP substrate 161. The protruding portions 282 mechanically and electrically connect the first parasitic elements 635 to RF connecting pads 381, which are coupled to to first VP switchable elements 382. As noted above, the first VP switchable elements 382 are configured to control operation of parasitic elements 635. The VP switchable elements 382 comprise PIN diodes, varicaps, or microelectromechanical systems (MEMS) elements.

The excitation elements 615 and parasitic elements 635 are spaced apart from each other on first VP substrate 161. When VP switchable element 382 is in the "ON" operational mode, parasitic elements 635 operates to block the RF wave emitted by the corresponding excitation element 615. It should be noted that parasitic elements 635, 636 and VP excitation elements 615, 616 may be located on the same surface of VP substrates 161, 162 or on opposite surfaces of VP excitation elements 615, 616.

When VP switchable element 382 is in the "ON" operational mode, parasitic element 635 blocks reception of the RF wave at the corresponding excitation element 615. When all VP switchable elements 382 are in the "OFF" operational mode, parasitic elements 635 permit the omnidirectional radiation of RF wave that is vertically polarized. Switching VP switchable elements 382 between the "ON" and "OFF" operational modes enables the modification and control of the radiation pattern of antenna structure 100. The ability to switch between "ON" and "OFF" modes enables the generation of omnidirectional radiation patterns or generation of directional radiation patterns.

For example, when two neighboring first VP switchable elements 382 (e.g. 382a, 382b in FIG. 3A) are in the "ON" operational mode at the same time and the other first VP switchable elements 382 (e.g. 382c, 382d) are in the "OFF" mode, antenna structure 100 generates a directional radiated pattern having a higher gain as compared with the omnidirectional pattern.

It should be understood that first VP substrate 161 may have any number of protrusions 282 matching corresponding apertures in first HP substrate 111 for mounting of first HP substrate 111 on first VP substrate 161.

As noted above, second VP substrates 162a, 162b are mounted on base unit 103 and second parasitic elements 636 are electrically connected to second VP switchable elements 520 located on base unit 103. Referring again to FIG. 5, base unit 103 further comprises second VP switchable elements 520 which are connected to corresponding RF connecting pads 581 via a DC circuit. By mounting second VP substrate 162 to base unit 103, parasitic elements 636 of second VP unit 152 are electrically connected to second VP switchable elements 520. The electrical connection may be achieved by soldering parasitic elements 636 to RF connecting pads 581 after inserting protruding portions 286 of second VP substrate 162 in second VP apertures 561 in base unit 103. Similar to the operation of first VP unit 151, by switching between "ON" and "OFF" operational modes, the second VP switchable elements 382 control the radiation pattern of second VP unit 152.

In some embodiments, first and second HP units 101, 102 and first and second VP units 151, 152 may operate in a similar RF frequency range. For example, all HP and VP units 101, 102, 151, 152 may operate at a frequency range of 5 gigahertz (GHz) or 6 GHz. In other embodiments, the first HP unit 101 and second VP unit 152 may operate in a first frequency range, while second HP unit 102 and first VP unit 151 operate in a second frequency range. The first frequency range may comprise frequencies that are lower than the frequencies of the second frequency range. For example, the first frequency range may comprise 5 GHz and the second frequency range may comprise 6 GHz.

In certain embodiments, the first frequency range may overlap with the second frequency range. For example, a difference between the first frequency range and the second frequency range may be about or more than 1 GHz, such that the first frequency range includes 5 GHz and the second frequency range includes 6 GHz.

In certain embodiments, the first HP unit 101 may be disposed further away from main ground layer 515, which is positioned on a top surface of base unit 103. This enables first HP unit 101 to operate in a frequency range that includes lower frequencies as compared to the operation of the frequency range of the other HP unit.

The first and second VP units 151, 152 may be configured to radiate the RF wave in the same frequency ranges. Alternatively, first and the second VP units 151, 152 may be configured to radiate in two different frequency ranges. In some embodiments, first VP unit 151 may be configured to radiate in 5 GHz frequency range and the second VP unit 152 may be configured to radiate the RF wave in 6 GHz frequency range.

It should be understood that the configuration of the excitation elements 615, 616 depends on the frequency bandwidth of RF wave that is radiated by the excitation elements. In some embodiments, excitation portions 626 of VP excitation elements 616 operating at 6 GHz may be located closer to central axis $\mu l$ of antenna structure 100, as compared to VP excitation elements 615 operating at 5 GHz.

Referring again to FIGS. 3A-4B, first HP unit 101 comprises feeding apertures 360, and second HP unit 102 comprises feeding apertures 460. Moreover, as shown in FIG. 1, feeding apertures 360 of first HP unit 101 are configured to receive first protruding portions 281 of feeding supports 171. Feeding apertures 460 of second HP unit 102 are configured to receive second protruding portions 283, 284 of feeding supports 171, 172, respectively. The first HP unit 101 has VP apertures 361 for receiving protruding portions 282 of first VP substrates 161. The second HP unit 102 may also have additional apertures for receiving protruding portions of first and second VP substrates 161a, 161b, 162a, 162b.

Figure 7A:
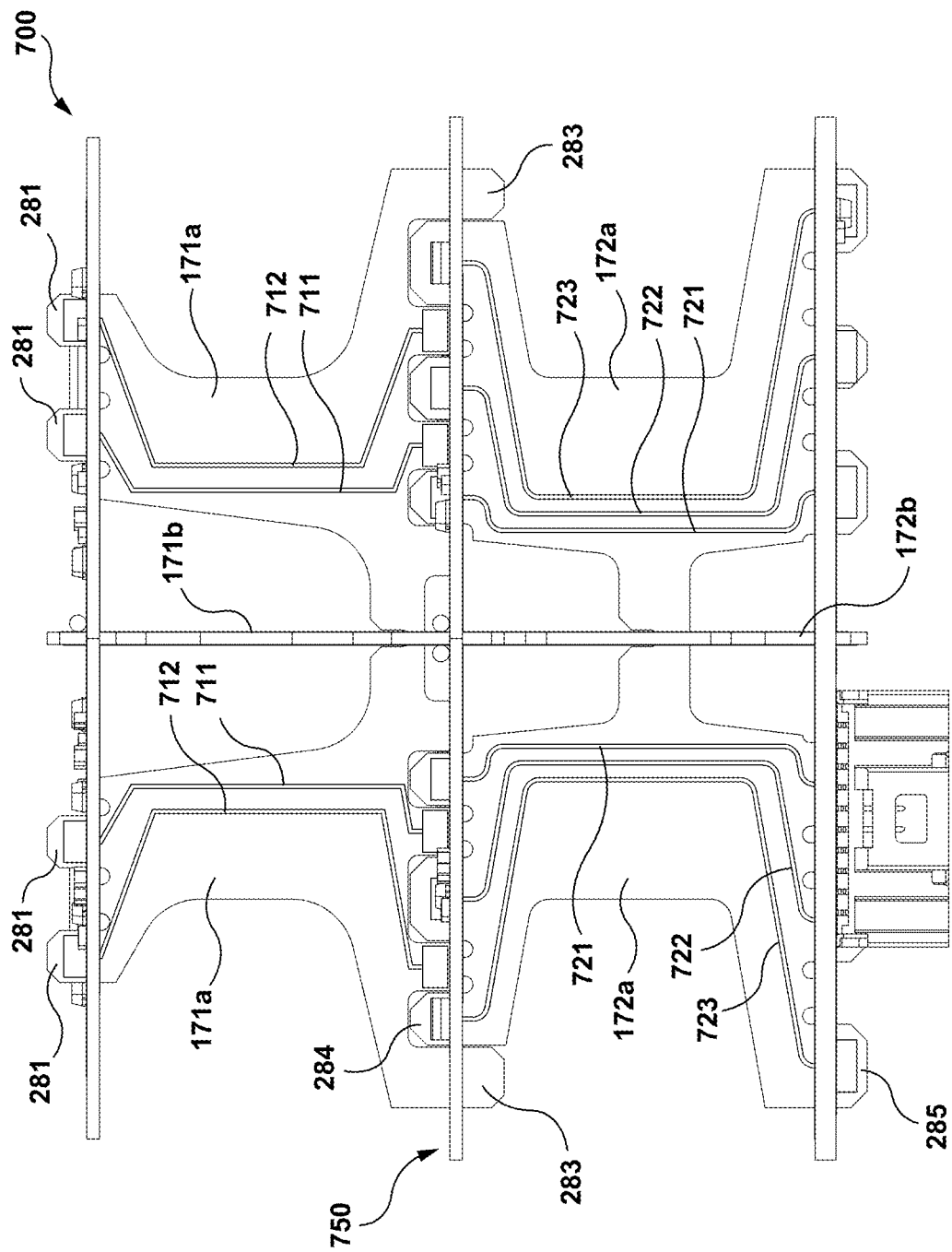
FIG. 7A depicts a front view of feeding supports mounted on the first and second HP units of the antenna structure of FIG. 1, in accordance with at least one non-limiting embodiment of the present disclosure.
Figure 7B:
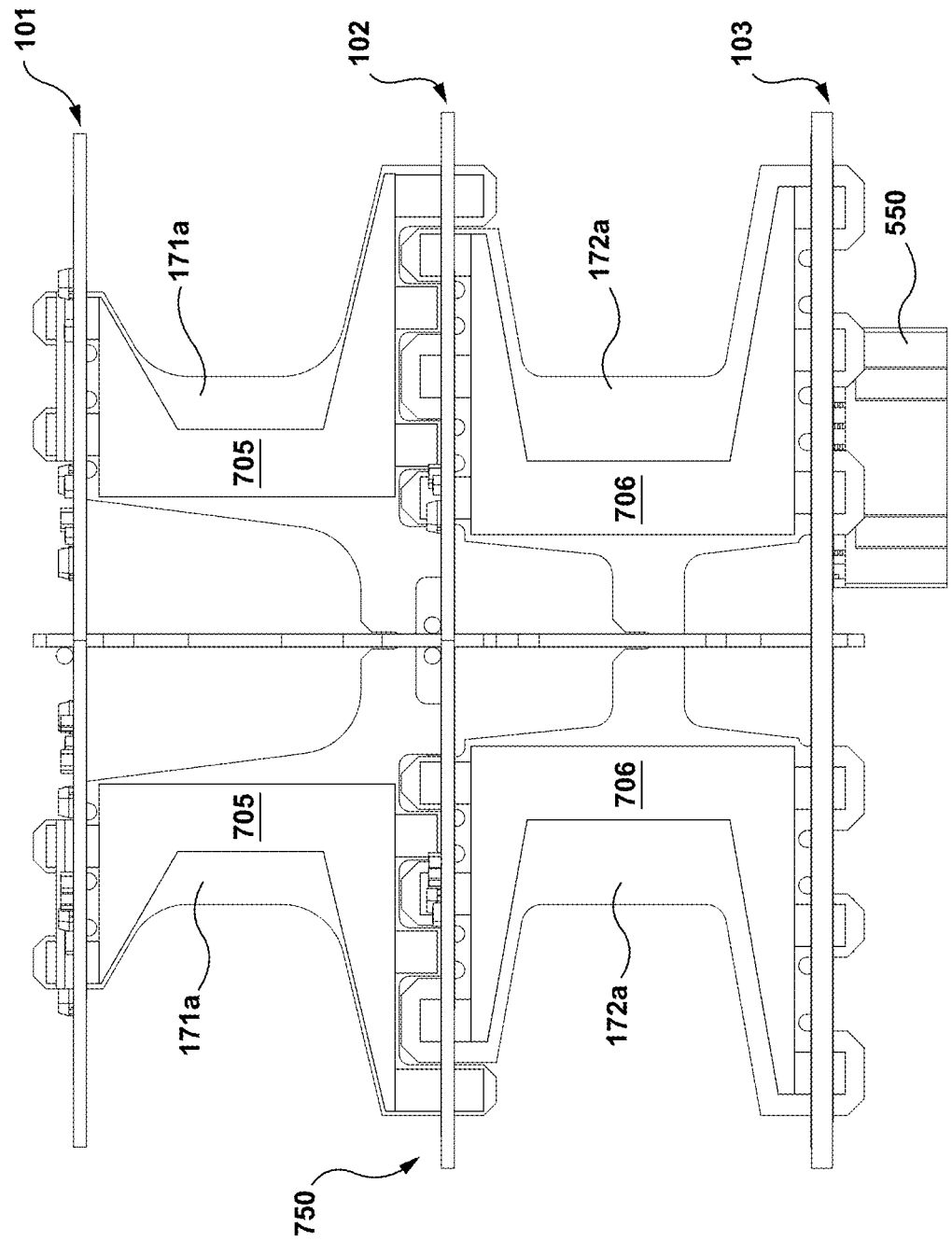
FIG. 7B depicts a back view of feeding supports mounted on the first and second HP units of the antenna structure of FIG. 1, in accordance with at least one non-limiting embodiment of the present disclosure.

FIGS. 7A, 7B depict front and back side view of feeding supports 171, 172 mounted on the first and second HP units 101, 102 of antenna structure 100 in accordance with embodiments of the present disclosure. The pair of first feeding supports 171a, 171b (also referred to herein as "first feeding supports 171") and the pair of second feeding supports 172a, 172b (also referred to herein as "second feeding supports 172") are configured to provide direct electrical current or voltage from base unit 103 to first HP unit 101 and second HP unit 102. In particular, feeding supports 171, 172 may provide direct electrical current/voltage to first HP switchable elements 320, second HP switchable elements 420 and first VP switchable elements 382.

Each of the first feeding supports 171a, 171b contains a pair of two DC lines 711, 712. The DC lines 711, 712 provide a current and voltage to the first HP unit 101 and, in particular, to first HP switchable elements 320 and first VP switchable elements 382 located on first HP unit 101.

Each of the second feeding supports 172a, 172b contains a pair of three DC lines 721, 722, 723. The DC lines 721, 722 provide a current and oltage to first HP switchable elements 320 and first VP switchable elements 382 located on first HP unit 101. The third DC line 723 provides a current and voltage from base unit 103 to second HP switchable elements 420 located on second HP unit 102.

In a DC junction area 750, portions of first and second feeding supports 171, 172 and a portion of second HP unit 102 are configured to transmit DC current from second feeding support 172 to first feeding support 171. The DC lines 721, 722 are electrically connected to DC lines 711, 712 of first feeding supports 171a, 171b on the second HP unit 102. In some embodiments, DC lines 711 and DC lines 721 of the corresponding first and second feeding supports 171 and 172 may be soldered to a corresponding common second DC conducting pad 490 located on HP unit 102. Similarly, DC lines 712, 722 of the corresponding first and second feeding supports 171 and 172 are soldered to another corresponding common second DC conducting pad 490 located on HP unit 102.

As depicted in FIG. 7B, feeding supports 171, 172 also comprise feeding ground layers 705, 706 which are configured to provide electrical ground to first and second HP units 101, 102 from base unit 103. The feeding ground layers 705, 706 of feeding supports 171, 172 may be made of a metal material, such as, for example, copper. In the illustrated embodiment, feeding ground layers 705, 706 are located on the surface of feeding supports 171, 172 that are opposite to the surfaces bearing DC lines 711, 712 and 721, 722, respectively.

In the junction area 750, feeding ground layers 706 of second feeding supports 172 are electrically connected to feeding ground layers 705 of first feeding supports 171. Referring also to FIG. 4A, feeding ground layers 705, 706 may be connected to second ground conducting pads 488, for example by soldering. In some embodiments, the soldering may be performed after inserting protruding portions 283 of feeding supports 171 in apertures 460 in second HP unit 102. In some embodiments, first and second feeding supports 171, 172 have protruding portions in order to couple them with second HP unit 102.

Referring again to FIG. 5, base unit 103 of antenna structure 100 comprises base feeding apertures 560 for receiving protruding portions 285 of second feeding supports 172a, 172b. In some embodiments, second feeding supports 172a, 172b are mounted on base unit 103 by inserting protruding portions 285 of second feeding supports 172 into matching base feeding apertures 560 in base unit 103.

The base unit 103 also has VP apertures 561 for receiving protruding portions 286 of second VP substrates 162a, 162b. It should be understood that there may be any number of protruding portions 285 of second feeding supports 172a, 172b and any number of protruding portions 286 of second VP substrates 162a, 162b with matching apertures in base unit 103.

As shown in FIG. 5, the base feeding apertures 560 are adjacent to base DC conducting pads 590 and base ground conducting pads 588 that are located on the underside of base unit 103. Each DC conducting pad 590 is electrically connected to a controller (not shown) via a power connector 550 (DC and RF lines are not depicted in FIG. 5B for purposes of simplification). The base DC conducting pads 590 are positioned such that, when second feeding supports 172 are mounted on base unit 103 and protruding portions 285 of second feeding supports 172 are received by base feeding apertures 560, conducting pads 590 are electrically connected to DC feeding lines 721, 722, 723 located on feeding supports 172.

Each feeding line 721, 722, 723 provides DC current to one of switching elements of antenna structure 100. Such switchable elements are: first switchable elements 320 configured to operate IFAs of first HP unit 101; second switchable elements 420 configured to operate IFAs of second HP unit 102; and VP switchable element 382 configured to operate first parasitic elements 635.

Referring to FIGS. 1-2 and 4A-5B, base unit 103 and second HP unit 102 may incorporate cable apertures 485, 585 for passing RF cables 191, 193 that provide RF signal to first feeding port 330 of first HP unit 101 and to first VP unit 101, respectively. The base unit 103 may also have an additional cable aperture 585 for passing RF cable 192 configured to provide RF signal to second HP feeding port 430.

To manufacture antenna structure 100, first HP antenna unit 101, second HP antenna unit 102, and base 103 may be first manufactured separately. All surface mounted components, such as, for example, first and second HP switchable elements 320, 420, capacitors 331, 431, 332, 432, first VP switchable elements 382, resistors 385, matching circuits 335, 435, second VP switchable elements 520, power connector 550, etc., may be assembled using standard techniques and processes.

Referring to FIGS. 5-7B, the second VP substrates 162a, 162b and second feeding supports 172a, 172b may be then mounted on base unit 103. The second parasitic elements 636 may then be connected to RF connecting pads 581 on base unit 103. The excitation elements 626 may be connected to RF signal pad 595. The ground layers 706 may be connected to base ground conducting pads 588. The DC connecting lines 721, 722, 723 may be connected to base DC conducting pads 590 on base unit 103. These elements may be connected to each other, e.g. by soldering, to form a first sub-assembly.

To manufacture a second sub-assembly, first HP RF cable 191 may be attached to first HP unit 101, e.g. by soldering inner conductor of first HP RF cable 191 to first feeding port 330 on top surface 305 and soldering shield to ground layer 315 of first HP unit 101. First VP substrates 161a, 161b may then be attached to first HP unit 101.

Referring to FIG. 6B, an inner conductor of VP RF cable 193 may then be attached to first VP RF port 631 on first VP substrate 161a and/or 161b and a shield of VP RF cable 193 may be soldered to a VP ground pad 634. Electrical connections between first parasitic elements 635 and RF connecting pads 381 on first HP unit 101 (as depicted in FIG. 1), may also be soldered. The first HP unit 101 with attached cable 191 and first VP substrates 161 with attached cable 193 form the second sub-assembly.

In some embodiments, antenna structure 100 may also comprise a VP feed substrate (not shown in drawings) that may be located in first waveguide 201 and positioned in a parallel manner to first and second substrates 111, 112. Such VP feed substrate may have apertures to receive portions of first feeding supports 171 and first VP substrates 161. VP RF cable 193 may be attached to the VP feed substrate and the VP feed substrate may then be soldered to first VP substrates 161 when mounting of the second sub-assembly.

To manufacture a third sub-assembly, second HP RF cable 192 is attached to second HP unit 102, such as, for example, by soldering an inner conductor of the second HP RF cable 192 to second feeding port 430 of second HP unit 102 and soldering a shield of the second HP RF cable 192 to second ground layer 415 of second HP unit 102. In some embodiments, the first, the second, and the third sub-assemblies may be manufactured in any order relative to each other.

To manufacture a fourth sub-assembly, second HP unit 102 having attached cable 192 is subsequently mounted on protruding portions 284 of second feeding supports 172 of the first sub-assembly. The first feeding supports 171 may then be installed on top surface 405 of second HP unit 102. DC connecting lines 721, 722, 723 and 711, 712 are connected to second DC conducting pads 490 located in second HP unit 102. This provides continuity of DC signals between first DC connecting lines 721, 722, 723 located on second feeding supports 172 and first DC connecting lines 711, 712 located on first feeding supports 171.

Feeding ground layers 706 and 705 are connected to second ground conducting pads 488 of second HP unit 102, providing continuous ground plane. Performing this step before installing first HP unit 101 allows for access to solder areas. It should be noted that second ground pads 488 are connected to second ground layer 415 by ground vias 426.

The second and fourth sub-assemblies may then be connected by mounting first HP unit 101 with attached cable 191 and first VP substrates 161 with attached cable 193 on top of feeding supports 171. Electrical connections between DC connecting lines 711, 712 of first supports 171 may then be soldered to VP DC line connectors 390 on first HP unit 101. Feeding ground layers 705 may be soldered to first ground conducting pads 388 on top of first HP unit 101.

Figure 13:
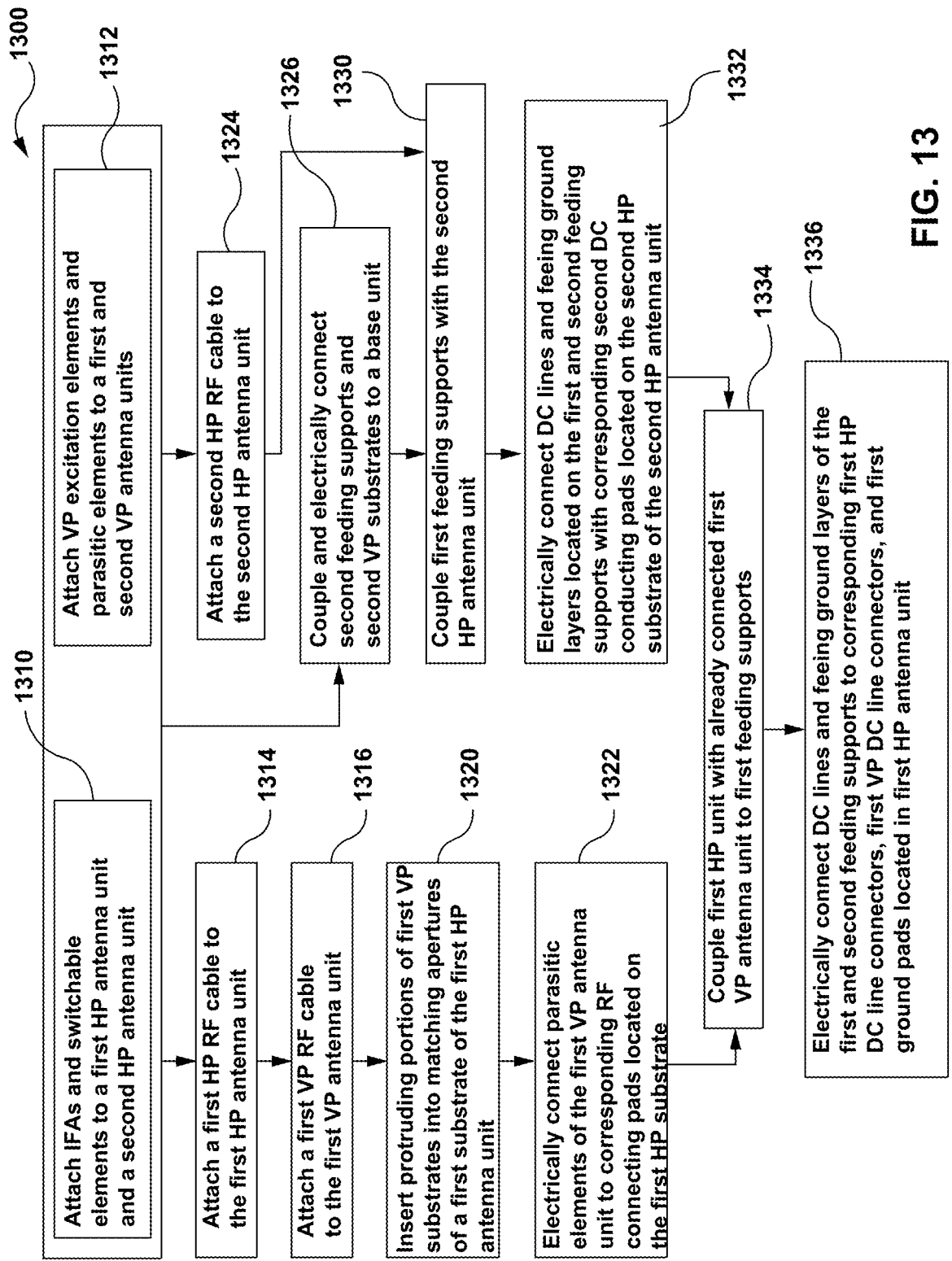
FIG. 13 depicts a flow chart illustrating a method for manufacturing of the antenna of FIG. 1, in accordance with at least one non-limiting embodiment of the present disclosure.

FIG. 13 illustrates a flowchart describing method 1300 for manufacturing an antenna structure for the communication of a radio-frequency (RF) wave, in accordance with the disclosed embodiments of the present disclosure. Method 1300 commences at step 1310 in which IFAs 310, 410 and switchable elements 320, 420 are attached to first HP substrate 111 of first HP antenna unit 101 and second HP substrate 112 of second HP antenna unit 102, respectively. Other corresponding electronic components, such as capacitances, resistors and various conducting pads and DC line connectors (e.g. RF connecting pads 381, first and second ground conducting pads 388, 488, VP DC line connector 390, HP DC line connector 391), may be attached to first HP antenna unit 101 and second HP antenna unit 102, as described above.

At step 1312, VP excitation elements 635, 636 are attached to first and second VP antenna units 151, 152. At step 1314, first HP RF cable 191 is attached to first HP antenna unit 101. At step 1316, first VP RF cable 193 is attached to first VP antenna unit 151. As discussed above, first HP RF cable may be attached by soldering inner conductor on top surface 305 of first HP antenna unit 101 and soldering shield on underside surface 306 of first HP antenna unit 101.

At step 1320, first VP substrates of first VP antenna unit 151 are coupled to first HP antenna unit 101 by inserting protruding portions of first VP substrates 161 into matching apertures 361 of first HP substrate 111. At step 1322, parasitic elements 635, located at least partially on the protruding portions of first VP substrates 161, are electrically connected to corresponding RF connecting pads 381 located on first HP substrate 111.

At step 1324, second HP RF cable 192 is attached to second HP antenna unit 102. At step 1326, second feeding supports 172 and second VP substrates 162 are coupled to base unit 103 by inserting protruding portions of second feeding supports 172 and second VP substrates 162 into matching apertures 560, 561 of base unit 103. In some embodiments, steps 1314, 1316, 1324, 1326 may be performed in any order relative to each other.

At step 1330, second HP antenna unit 102 is coupled to first feeding supports 171 and second feeding supports 172 by inserting protruding portions of first feeding supports 171 and second feeding supports 172 into matching apertures 460 in the second HP substrate 112 of the second HP antenna unit 102.

At step 1332, DC lines 711, 712, 721, 722 and feeding ground layers 705, 706 are electrically connected to corresponding second DC conducting pads 490 and second ground pads 488, respectively, which are located on second HP substrate 112. As indicated in the illustrated embodiments of FIGS. 7A, 7B, DC lines 711, 712, 721, 722 and feeding ground layers 705, 706 may be located partially on second protruding portions 284 of first feeding supports 171 and on first protruding portions 283 of second feeding supports 172.

At step 1334, first HP unit 101 is coupled to first feeding supports 171 by inserting other protruding portions 281 of first feeding supports 171 into matching apertures 360 in first HP substrate 111 of first HP antenna unit 101. And, finally, at step 1336, DC lines 711, 712 and feeding ground layers 705, which are positioned at least partially on the other protruding portions 281 of first feeding supports 171, are electrically connected to corresponding first VP DC line connectors 390, first HP DC line connectors 391, and first ground pads 388 that are located on first HP substrate 111.

In some embodiments, attaching first VP RF cable 193 to first VP antenna unit 151 may include first attaching first VP RF cable 193 to the VP feeding substrate (not illustrated). An inner conductor of first VP RF cable 193 may be soldered on top and a shield of VP RF cable 193 may be soldered on an underside of the VP feeding substrate. The VP feeding substrate may then be coupled to first VP substrates 161 in a substantially perpendicular manner, and an RF feed point may be soldered to connect the VP feeding substrate and first VP substrates 161 of first VP unit 151. The first HP substrate 111, with attached first HP cable 191, may then be coupled with first VP substrates 161 of first VP unit 151. The protruding portions 282 of first VP substrates 161 are coupled with matching apertures 361 in first HP substrate 111 and portions of parasitic elements are soldered with RF connecting pads 381 to electrically connect first VP unit with VP switching elements 382 located in first HP unit 101. The VP feeding substrate becomes located approximately in parallel with first HP substrate 111 and second HP substrate 112 in first waveguide 201.

Figure 8A:
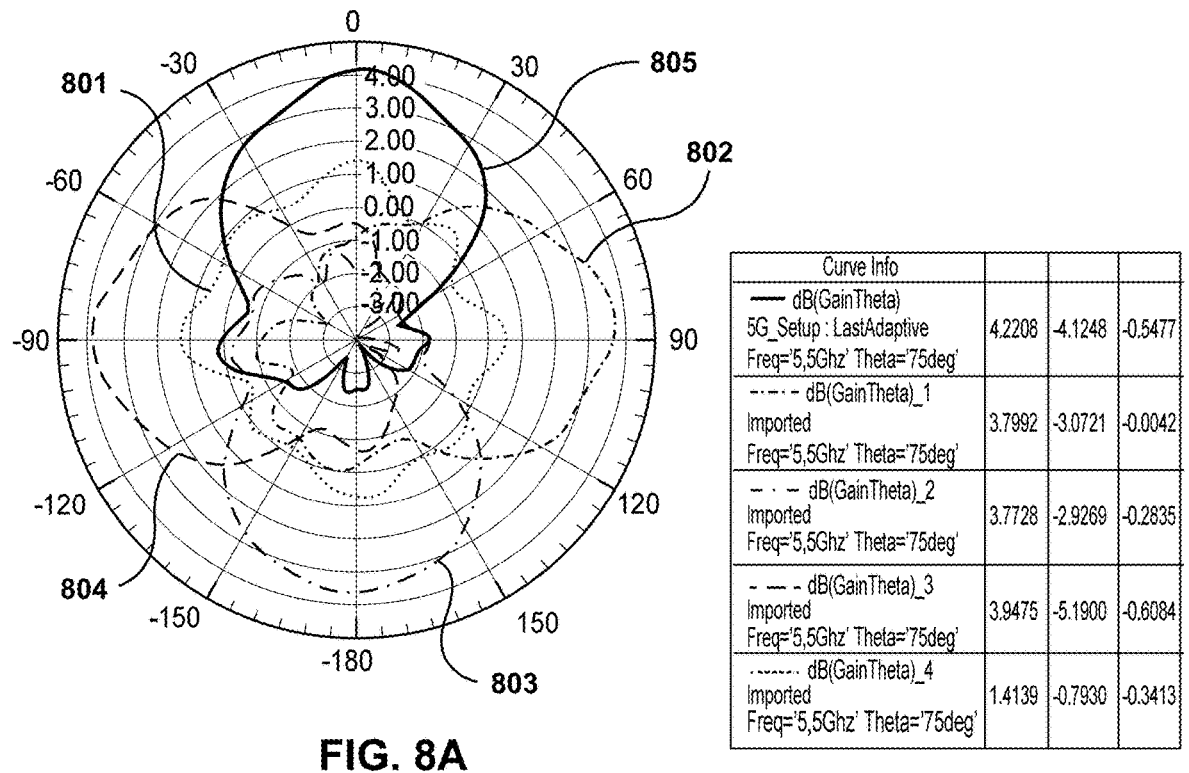
FIG. 8A depicts azimuth radiation patterns of operation of the antenna structure of FIG. 1 when the second VP unit is in an omnidirectional operation mode and in a directional operation mode, in accordance with at least one non-limiting embodiment of the disclosure.
Figure 8B:
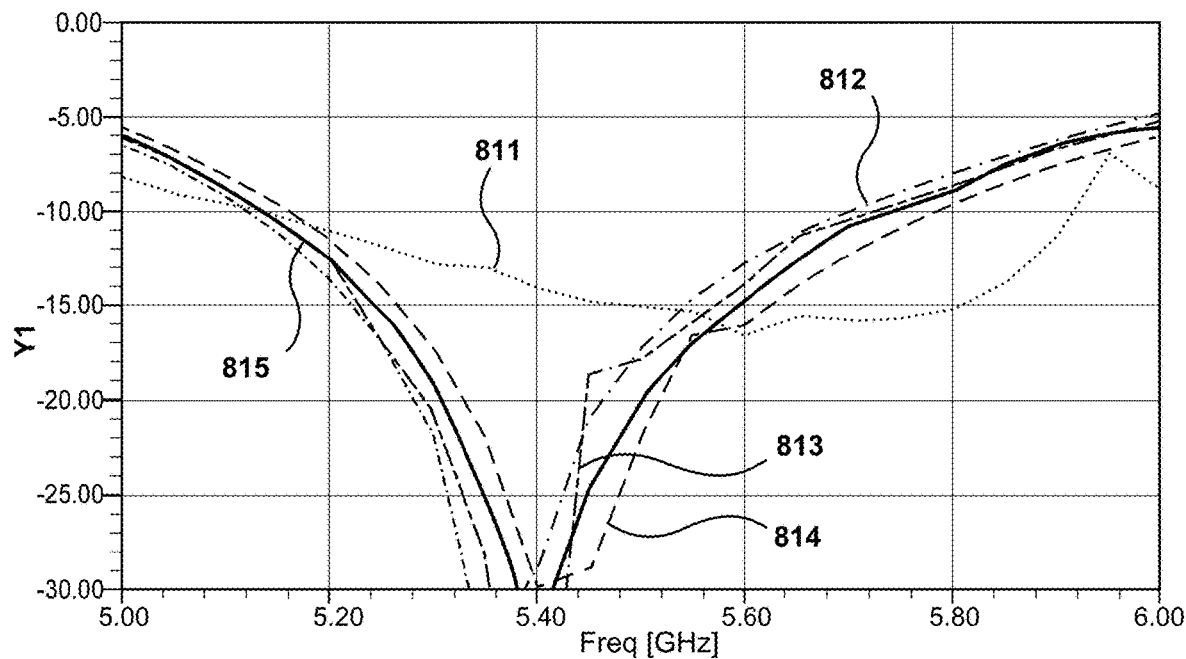
FIG. 8B depicts reflection coefficient (i.e., $S_{11}$-parameter) of the antenna structure of FIG. 1, when the first VP unit is in the omnidirectional operation mode and in the directional operation mode of FIG. 8, in accordance with at least one non-limiting embodiment of the disclosure.

FIG. 8A depicts azimuthal radiation patterns of second VP unit 152 of antenna structure 100, in accordance with the disclosed embodiments of the present disclosure. FIG. 8B depicts reflection coefficient (i.e., $S_{11}$-parameter) of second VP unit 152 of antenna structure 100, where second VP unit 152 operates in the 5 GHz frequency range. Curves 801, 811 illustrate the generated omnidirectional radiation pattern and reflection coefficient, respectively, of antenna structure 100 operating in an omnidirectional mode in which all four second VP switchable elements 520 of second VP unit 152 are in the "OFF" mode.

As noted above, VP units 151, 152 may operate in a directional mode in which two VP switchable elements 520 or 382 are in the "ON" mode. Curves 802, 803, 804, 805 illustrate the generated directional radiation patterns and corresponding $S_{11}$-parameters 812, 813, 814 815, respectively, for different radiated directions of second VP unit 152.

Figure 9A:
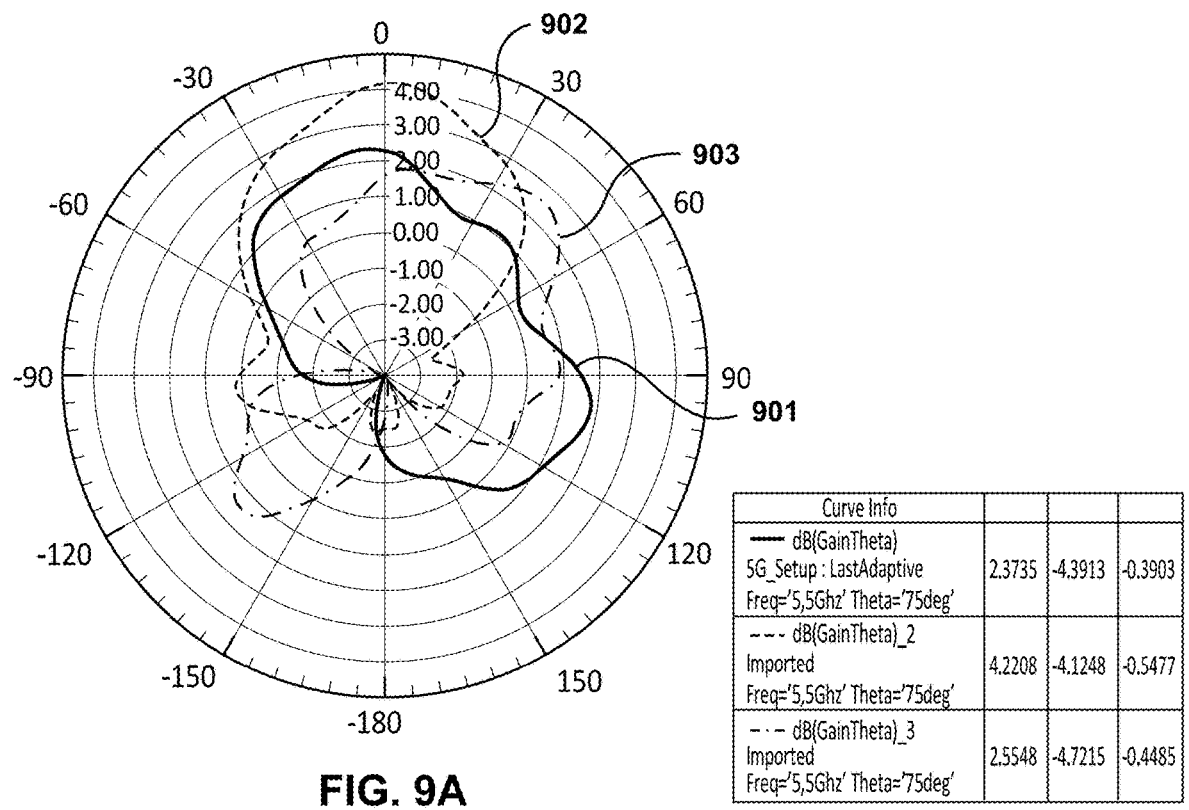
FIG. 9A depicts azimuth radiation patterns of the second VP unit of the antenna structure of FIG. 1 in a directional operation mode with one, two, and three second VP switchable elements being in "ON" mode, in accordance with at least one non-limiting embodiment of the present disclosure.
Figure 9B:
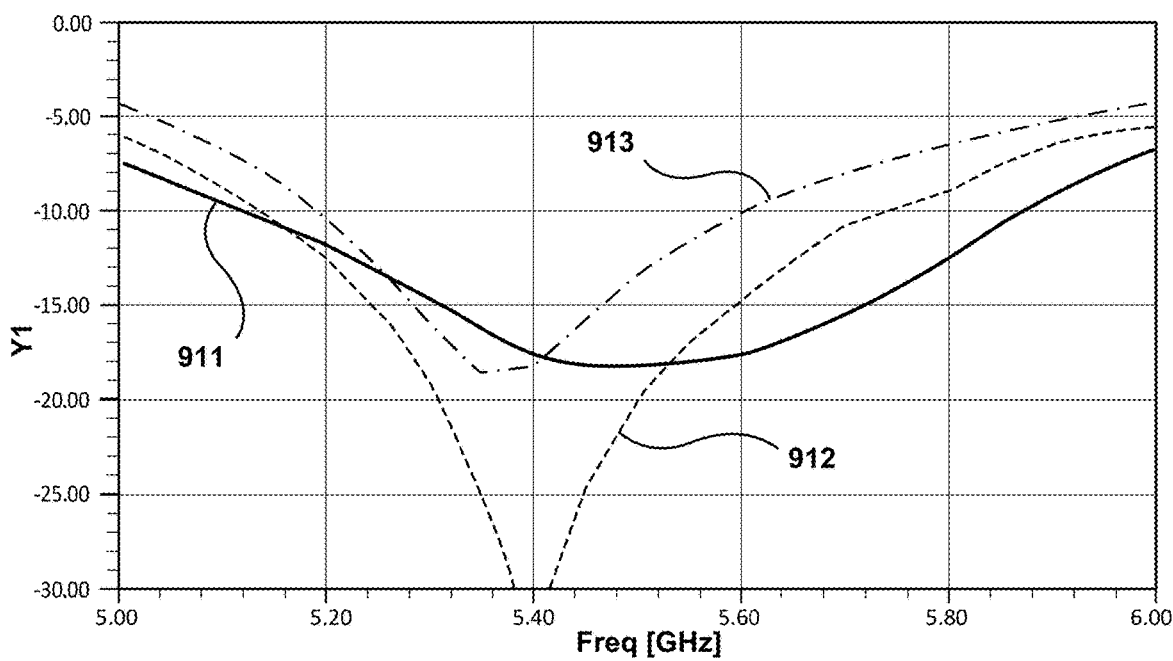
FIG. 9B depicts return loss for the second VP unit of the antenna structure of FIG. 1 in the directional operation mode with one, two, and three VP switchable elements being in "ON" mode, in accordance with at least one non-limiting embodiment of the present disclosure.

FIG. 9A depicts azimuth directional radiation patterns of operation of second VP unit 152 of antenna structure 100, when one, two, or three HP switchable elements are in the "ON" operation mode, in accordance with the embodiments of the present disclosure. As noted above, when second VP switchable elements 520 are in the "ON" mode, parasitic elements 636 block radiation of second VP excitation elements 626. Thus, curve 901 depicts the radiation pattern when a second VP switchable element 520 is in the "ON" operational mode, curve 902 depicts the radiation pattern when two second VP switchable elements 520 are in the "ON" operational mode, and curve 901 depicts radiation pattern when three second VP switchable elements 520 are in the "ON" operational mode. Moreover, FIG. 9B depicts a return loss for second VP unit 152 of antenna structure 100 of FIG. 9A. That is, curve 911 depicts the return loss when one second VP switchable element 520 is in the "ON" operation mode, curve 912 depicts the return loss when two second VP switchable elements 520 are in the "ON" operation mode, and curve 911 depicts return loss when three second VP switchable elements 520 are in the "ON" operation mode.

As described above, antenna structure 100 may be configured to operate in two frequency ranges and in two polarizations. Moreover, antenna structure 100 may be configured to switch between omnidirectional and directional operation modes.

Figure 10:
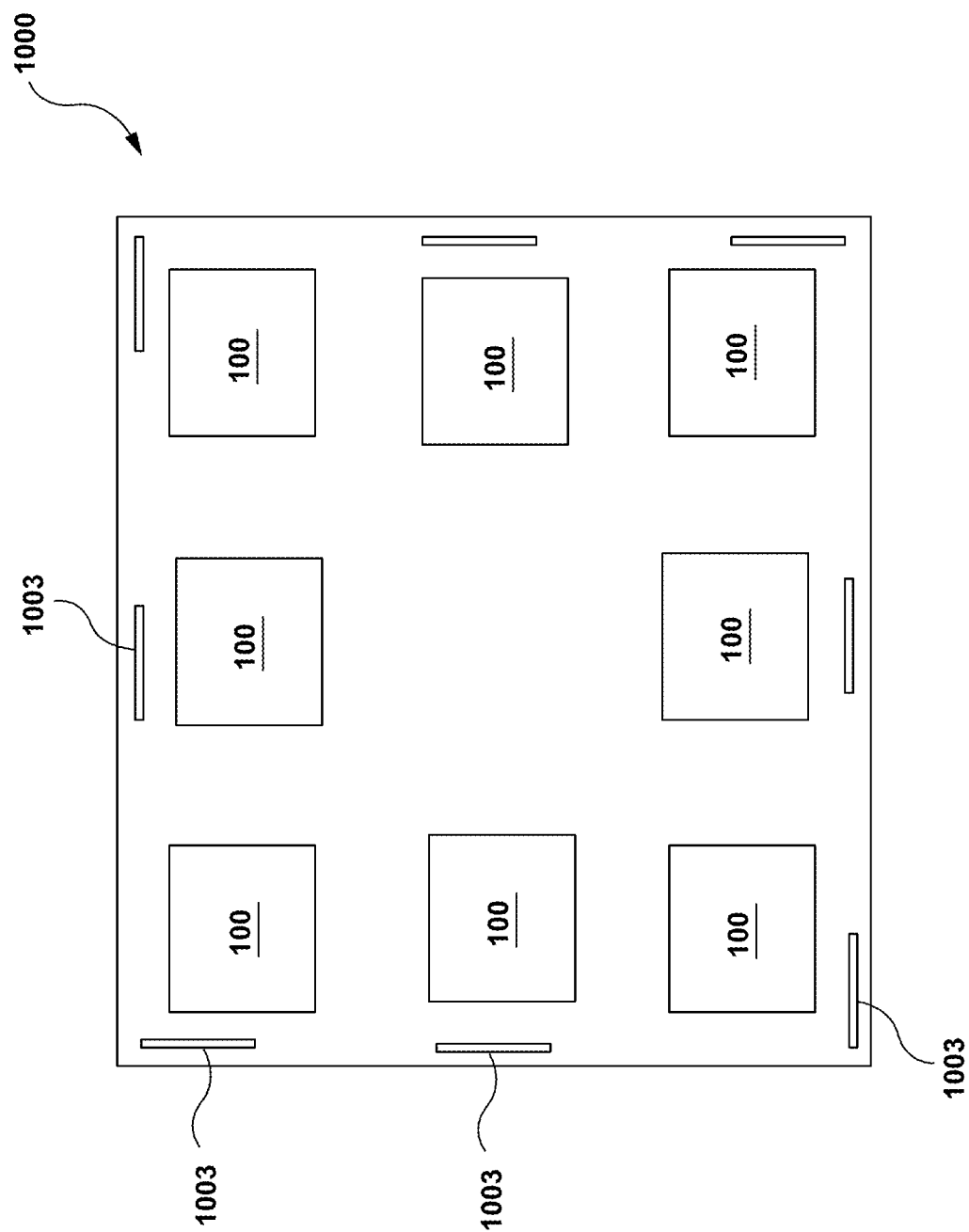
FIG. 10 depicts an antenna array, in accordance with at least one non-limiting embodiment of the present disclosure.

FIG. 10 depicts an antenna array 1000 in accordance with disclosed embodiments of the present disclosure. Antenna array 1000 comprises antennas 100 and third antenna units 1003. In some embodiments, antenna units 1003 may operate in a third frequency range, such as, for example, 2.5 GHz. Moreover, antenna units 1003 may be configured to generate radiation patterns that are vertically and horizontally polarized. In some embodiments, each antenna unit 1003 may comprise a third IFA configured to operate in the third frequency range having horizontal polarizations and a monopole element configured to operate in a third frequency range having vertical polarization. In so doing, antenna array 1000 may be configured to operate in three frequency ranges.

In the illustrated embodiment, antenna array 1000 may be reconfigurable to operate in two polarizations (vertical and horizontal) and three frequency ranges. In some embodiments, antenna array 1000 may accommodate 16 ports per band (i.e. 16 data streams). Four ports of antenna structure 100 may be collocated, as described herein, to reduce the size of antenna array 1000. Such a configuration, enables antenna array 1000 to perform omnidirectional and directional mode operations in two bands (e.g. 5 GHz and 6 GHz).

The 16 data streams of antenna array 1000 enable the use of Multi Input Multi Output (MIMO) technology, which helps to increase communication capacity. The mode switching capability of antenna structure 100 further increases the communication capacity, as it reduces undesired interferences and enhances transmission and reception gains.

Figure 11:
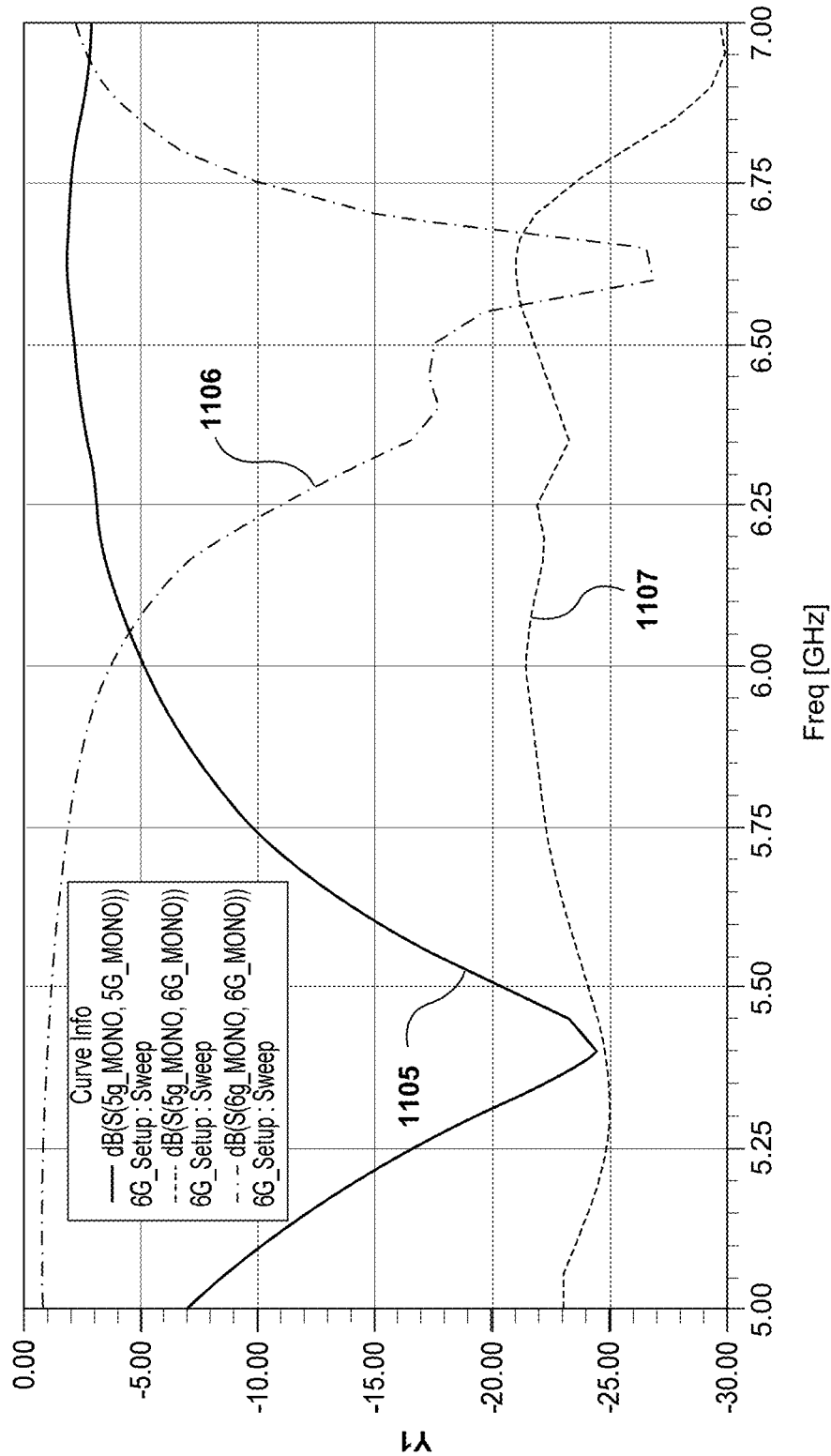
FIG. 11 depicts return loss, i.e. $S_{11}$-parameter, for the first VP unit operating in a 6 GHz band and for the second VP unit operating in a 5 GHz band, and a coupling coefficient, i.e. $S_{21}$-parameter, between the first VP unit and the second VP unit, as a function of frequency of the antenna structure of FIG. 1, in accordance with at least one non-limiting embodiment of the present disclosure.

FIG. 11 depicts return loss curves, i.e. Sp-parameter, for first VP unit 151 operating in the 6 GHz frequency range (curve 1106) and second VP unit 152 operating in 5 GHz frequency range (curve 1105), in accordance with the disclosed embodiments of the present disclosure. FIG. 11 further depicts the coupling coefficient, i.e. $S_{21}$-parameter, between first VP unit 151 and second VP unit 152 (curve 1107), as a function of frequency for VP excitation elements of antenna structure 100. As indicated, coupling between first and second VP units 151, 152 was substantially low, such that the $S_{21}$-parameter was less than −20 dB (curve 1107).

Figure 12C:
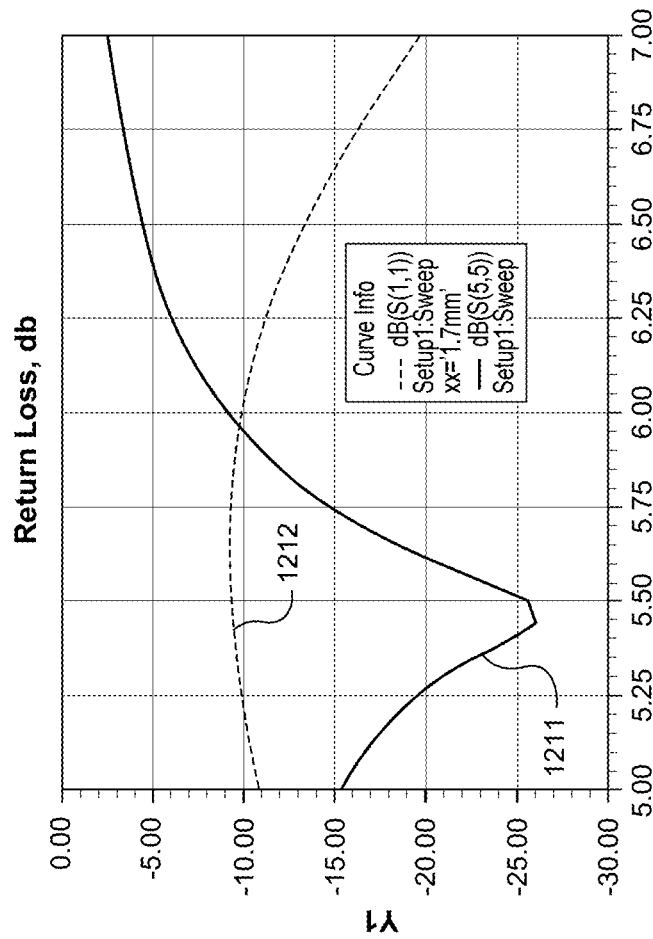
FIG. 12C depicts return loss, i.e. $S_{11}$-parameter, as a function of frequency of the antenna structure of FIG. 1 when the first HP unit operates in the 6 GHz band and the second HP unit operates in the 5 GHz band, in accordance with at least one non-limiting embodiment of the present disclosure.
Figure 12A:
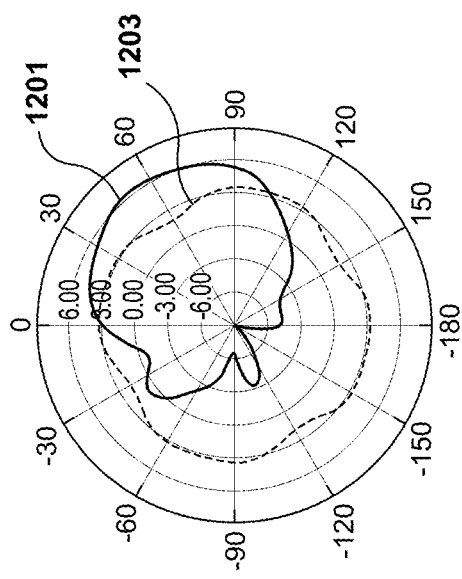
FIG. 12A depicts azimuth radiation patterns of the antenna structure of FIG. 1 when the second HP unit operates in a directional operation mode and in an omnidirectional operation mode, in accordance with at least one non-limiting embodiment of the present disclosure.
Figure 12B:
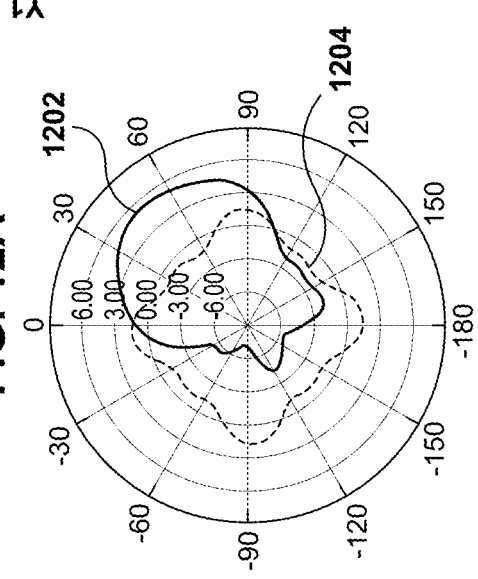
FIG. 12B depicts azimuth radiation patterns of the antenna structure of FIG. 1 when the first HP unit operates in the 6 GHz band in the directional mode and omnidirectional mode, in accordance with at least one non-limiting embodiment of the present disclosure.

FIGS. 12A, 12B respectively illustrate the azimuthal radiation patterns of first HP unit 101 (curves 1201 and 1203) and second HP unit 102 (curves 1202 and 1204), of antenna structure 100, in accordance with the disclosed embodiments of the present disclosure. The first HP unit 101 operates at a 5 GHz frequency range and second HP unit 102 operates at a 6 GHz frequency range, respectively. Solid curves 1201, 1202 depict the radiation patterns for directional mode operation when two switchable elements 320, 420 of first and second HP units 101, 102 are in the "ON" operation mode. Dashed curves 1203, 1204 depict the radiation patterns for omnidirectional mode operation when all switchable elements 320, 420 are in the "OFF" operation mode.

FIG. 12C depicts the return loss for first HP unit 101 (curve 1211) and for second HP unit 102 (curve 1212). In the illustrated embodiment, first HP unit 101 operates in the 5 GHz frequency range and second HP unit 102 operates in the 6 GHz frequency range.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. An antenna structure for communication of radio-frequency (RF) waves, the antenna structure comprising:
   a base unit;
   a first horizontal-polarization (HP) antenna unit including a plurality of first inverted-F antennas (IFAs) configured to radiate RF waves with a horizontal polarization;
   a second HP antenna unit having a plurality of second IFAs configured to radiate RF waves with the horizontal polarization, the second HP antenna unit positioned such that the first HP antenna unit and the second HP antenna unit are spaced apart from each other to form a first parallel-plate waveguide, and such that the second HP antenna unit and the base unit are spaced apart from each other to form a second parallel-plate waveguide;
   a first vertical-polarization (VP) antenna unit located in the first parallel-plate waveguide, the first VP antenna unit having a plurality of first VP excitation elements configured to radiate the RF waves having vertical polarization; and
   a second VP antenna unit located in the second parallel-plate waveguide, the second VP antenna unit having a plurality of second VP excitation elements configured to radiate the RF waves with the vertical polarization.

2. The antenna structure of claim 1, further comprising:
   a first plurality of HP switchable elements, each being connected to one of the first IFAs, the first plurality of HP switchable elements being configured to control a radiation pattern of the first HP antenna unit.

3. The antenna structure of claim 2, further comprising:
   a second plurality of HP switchable elements, each being connected to one of the second IFAs, the second plurality of HP switchable elements being configured to control the radiation pattern of the second HP antenna unit.

4. The antenna structure of claim 1, wherein the first VP antenna unit and the second VP antenna unit further comprise parasitic elements for controlling a radiation pattern of the RF waves by the first VP antenna unit and the second VP antenna unit.

5. The antenna structure of claim 4, wherein the parasitic elements are operated by VP switchable elements located in at least one of the first HP antenna unit and the second HP antenna unit.

6. The antenna structure of claim 1, wherein the first VP excitation elements form a first VP exciting probe, and the second VP excitation elements form a second VP exciting electric probe.

7. The antenna structure of claim 1, further comprising:
   a pair of second feeding supports and a pair of first feeding supports configured to provide electrical current to a first plurality of HP switchable elements, a second plurality of HP switchable elements and a first plurality of VP switchable elements.

8. The antenna structure of claim 7, wherein the pair of second feeding supports is configured to provide direct current to a second plurality of VP switchable elements.

9. The antenna structure of claim 1, wherein the first HP antenna unit comprises a first HP substrate having apertures for receiving protruding portions of first VP substrates of the first VP antenna unit.

10. The antenna structure of claim 9, wherein the received protruding portions of the first VP substrates are configured to electrically connect first parasitic elements located on the first VP substrates and a first plurality of VP switchable elements, the first plurality of VP switchable elements being located on the first HP substrate and configured to operate the first parasitic elements for controlling a radiation pattern of the second VP antenna unit.

11. The antenna structure of claim 10, wherein the first HP substrate comprises apertures for receiving protruding portions of first feeding supports configured to electrically connect the first plurality of VP switchable elements to first DC lines located on surfaces of the first feeding supports.

12. The antenna structure of claim 9, wherein the second HP antenna unit comprises a second HP substrate having apertures for receiving other protruding portions of the first VP substrates of the first VP antenna unit.

13. The antenna structure of claim 10, wherein
the base unit comprises a second plurality of VP switchable elements configured to operate second parasitic elements for controlling a radiation pattern of the second VP antenna unit, the second parasitic elements being electrically connected to the second plurality of VP switchable elements.

14. The antenna structure of claim 1, wherein the second HP antenna unit further comprises:
ground conducting pads located on the second HP antenna unit and configured to electrically connect first feeding ground layers located on first feeding supports to second feeding ground layers located on second feeding supports;
DC conducting pads located on the second HP antenna unit and configured to electrically connect first DC lines located on the first feeding supports to the second DC lines located on the second feeding supports, and
apertures configured to receive protruding portions of the second feeding supports comprising portions of the second DC lines and the second feeding ground layers.

15. The antenna structure of claim 1, wherein each of the first HP antenna unit, the second HP antenna unit, the first VP antenna unit, the second VP antenna unit, and base unit comprise at least one substrate made of a printed circuit board (PCB).

16. The antenna structure of claim 1, wherein
the first HP antenna unit and the second VP antenna unit are configured to operate in a first frequency range; and
the second HP antenna unit and the first VP antenna unit are configured to operate in a second frequency range.

17. The antenna structure of claim 16, wherein the first frequency range overlaps with the second frequency range.

18. The antenna structure of claim 16, wherein a difference between the first frequency range and the second frequency range is at least 1 gigahertz (GHz).

19. The antenna structure of claim 18, wherein the first frequency range comprises frequencies that are lower than frequencies of the second frequency range.

20. The antenna structure of claim 19, wherein the first frequency range comprises 5 GHz and the second frequency range comprises 6 GHz.

21. The antenna structure of claim 1, wherein the antenna structure is one of a plurality of antenna structures forming an antenna array, and the antenna array further comprises a plurality of third antenna units, each third antenna unit having a monopole configured to radiate the RF waves being vertically polarized in a third frequency range and a third IFA configured to radiate the RF waves being horizontally polarized.

22. The antenna structure of claim 21, wherein the third frequency range comprises 2.5 GHz.

23. A method for manufacturing an antenna structure for transmission of a radio-frequency (RF) waves, the method comprising:
attaching inverted F antennas (IFAs) and switchable elements to a first horizontal-polarization (HP) substrate of a first HP antenna unit and a second HP substrate of a second HP antenna unit;
attaching first and second vertical-polarization (VP) excitation elements and first and second parasitic elements to first VP substrates and second VP substrates;
attaching a first HP RF cable to the first HP antenna unit, attaching a first VP RF cable to one of first VP substrates, and attaching a second HP RF cable to a second HP antenna unit;
coupling the first VP substrates to the first HP antenna unit and electrically connecting the first parasitic elements located on the first VP substrates to corresponding first RF connecting pads located on the first HP substrate;
attaching second feeding supports and second VP substrates to a base unit;
coupling the second HP antenna unit to first feeding supports and the second feeding supports and electrically connecting first and second DC lines and first and second feeding ground layers located on the first feeding supports and on the second feeding supports to corresponding second DC conducting pads and second ground pads located on the second HP substrate; and
coupling the first HP unit to the first feeding supports and electrically connecting the first DC lines and the first feeding ground layers located on the first feeding supports to corresponding first DC conducting pads and first ground pads located on the first HP substrate.

24. The method of claim 23, wherein attaching the first VP RF cable to the first VP antenna unit further comprises attaching the first VP RF cable to a VP feeding substrate and placing the VP feeding substrate approximately in parallel to the first HP substrate and the second HP substrate.

\* \* \* \* \*

UNITED STATES PATENT AND TRADEMARK OFFICE
CERTIFICATE OF CORRECTION

PATENT NO. : 10,797,408 B1  
APPLICATION NO. : 16/388274  
DATED : October 6, 2020  
INVENTOR(S) : Halim Boutayeb et al.

Page 1 of 1

It is certified that error appears in the above-identified patent and that said Letters Patent is hereby corrected as shown below:

In the Specification

Column 8, Line 54, replace "µl" with -- A1 --  
Column 9, Line 40, replace "µl" with -- A1 --  
Column 9, Line 44, replace "µl" with -- A1 --  
Column 9, Line 47, replace "µl" with -- A1 --  
Column 9, Line 48, replace "µl" with -- A1 --  
Column 9, Line 55, replace "µl" with -- A1 --  
Column 9, Line 59, replace "µl" with -- A1 --  
Column 9, Line 61, replace "µl" with -- A1 --  
Column 9, Line 67, replace "µl" with -- A1 --  
Column 10, Line 4, replace "µl" with -- A1 --  
Column 10, Line 6, replace "µl" with -- A1 --  
Column 10, Line 7, replace "µl" with -- A1 --  
Column 10, Line 23, replace "µl" with -- A1 --  
Column 12, Line 14, replace "µl" with -- A1 --

In the Claims

Column 19, Lines 41-43 (Claim 14), replace "the second DC lines located on the second feeding supports; supports, and" with -- second DC lines located on the second feeding support; and --

Signed and Sealed this  
Seventeenth Day of August, 2021

Drew Hirshfeld  
*Performing the Functions and Duties of the*  
*Under Secretary of Commerce for Intellectual Property and*  
*Director of the United States Patent and Trademark Office*